Patented Aug. 24, 1943

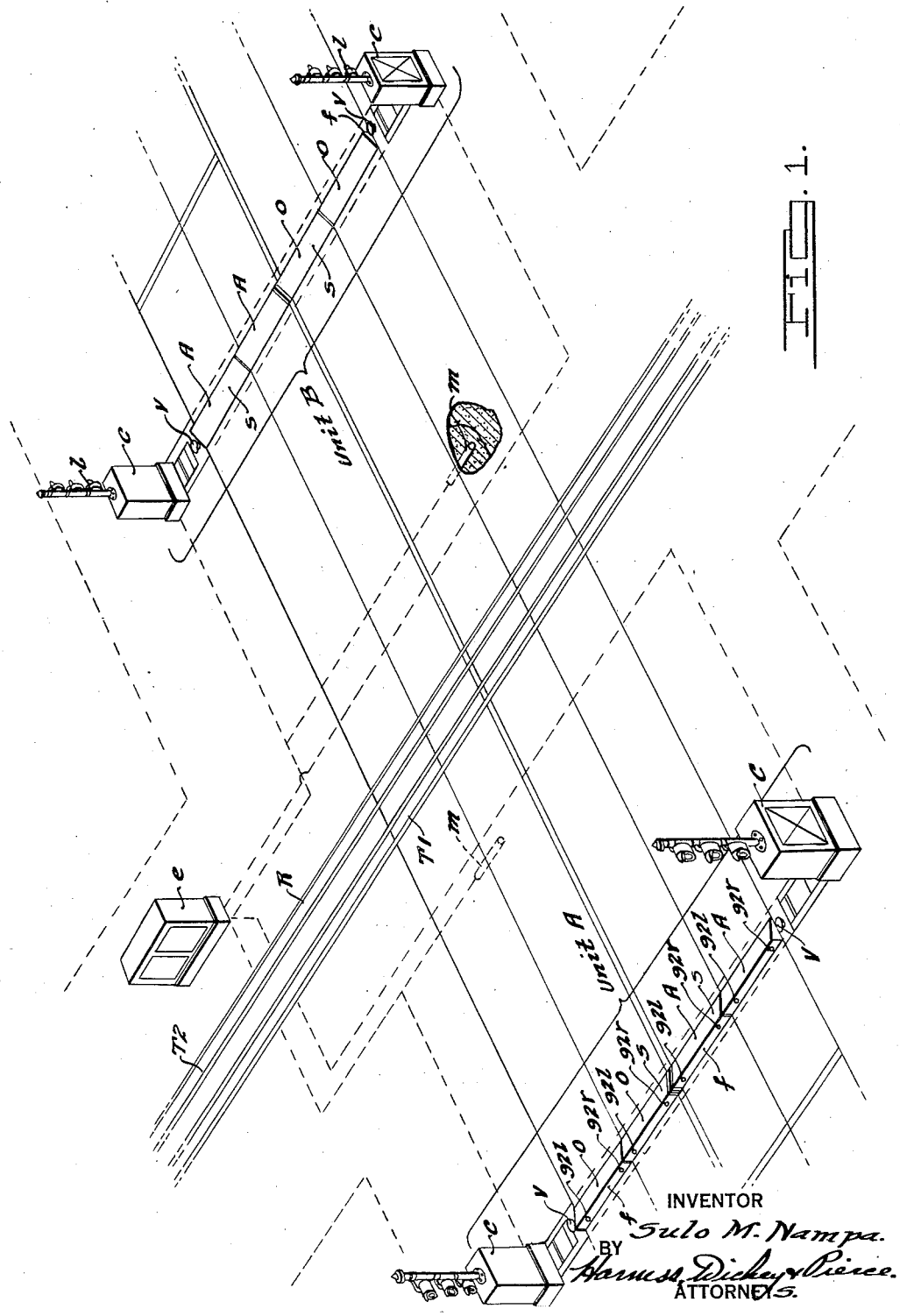

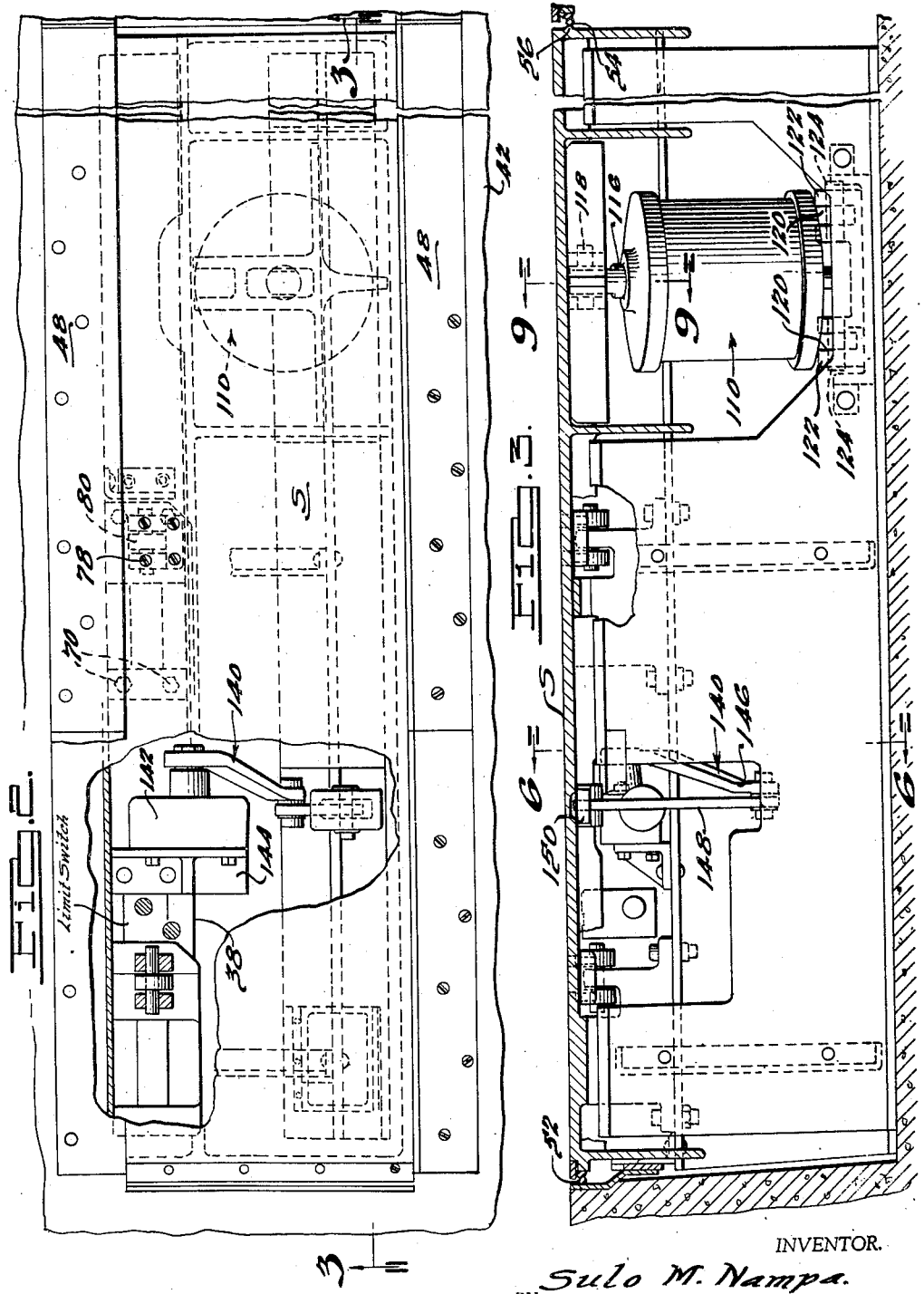

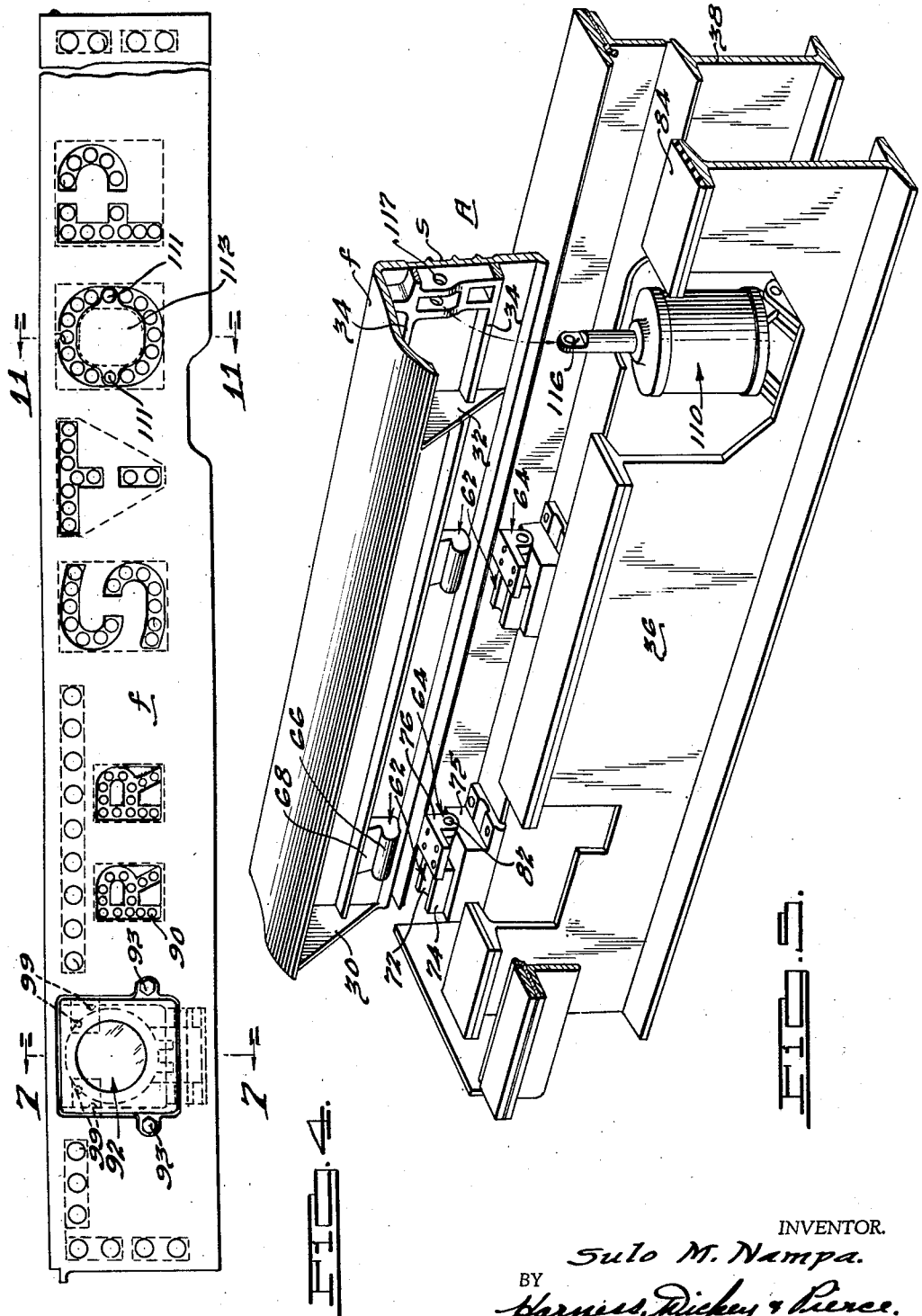

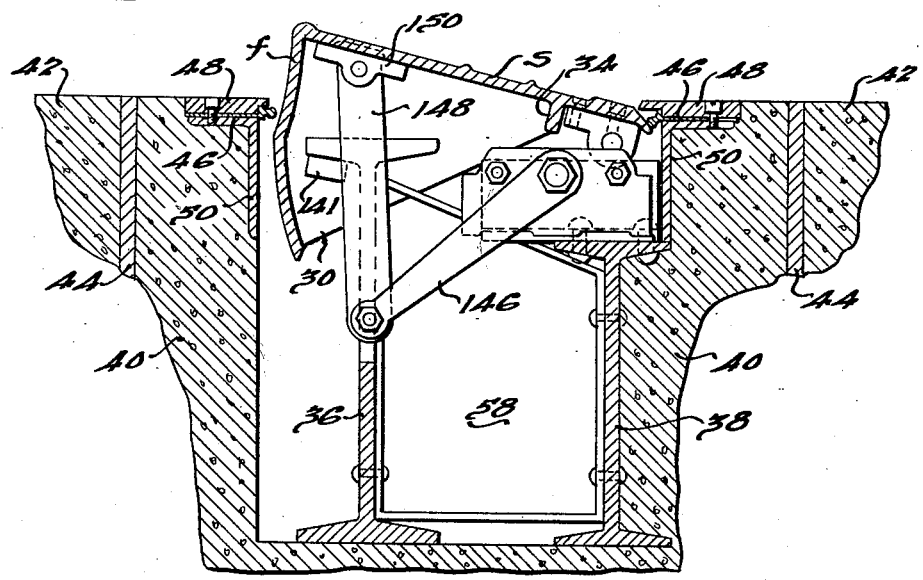

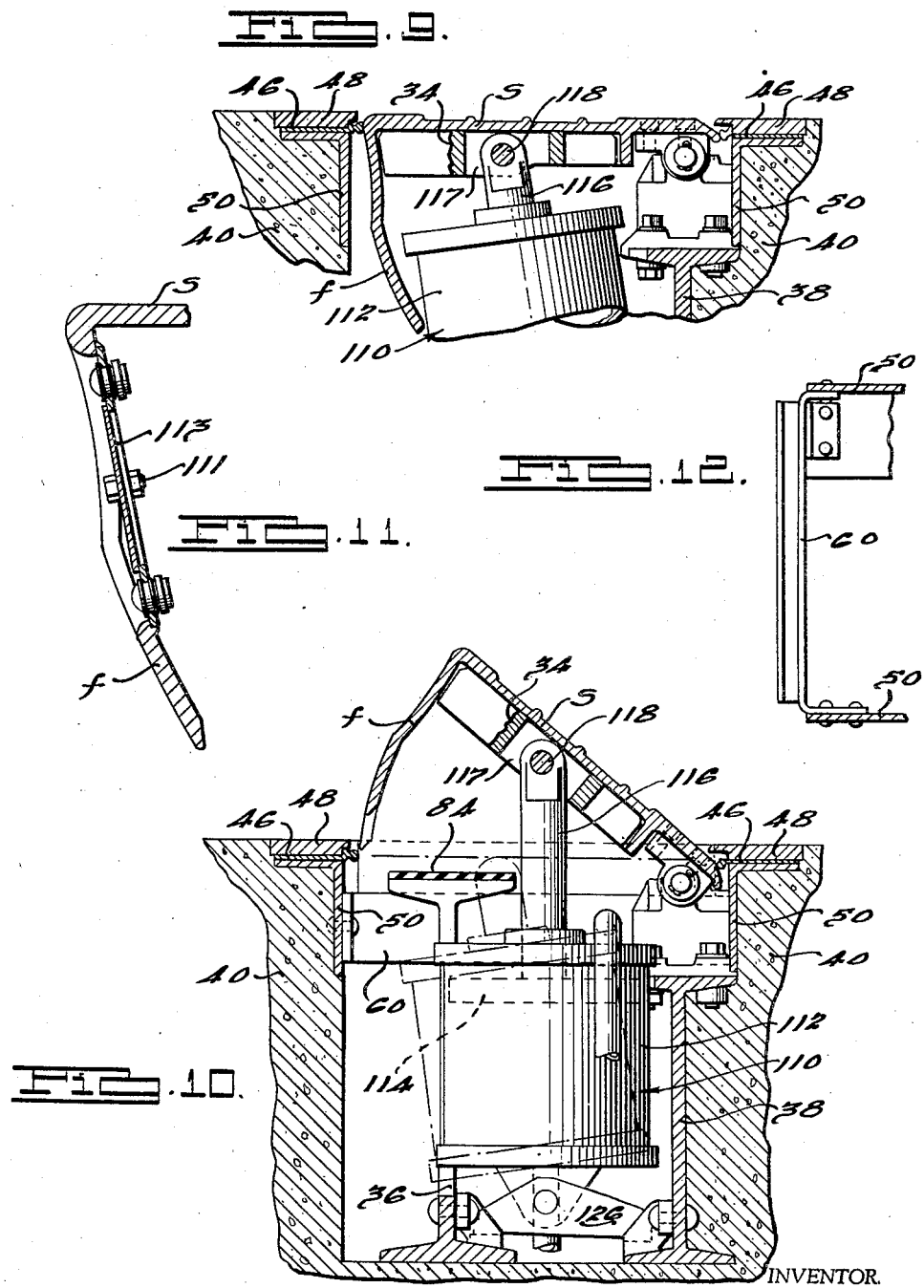

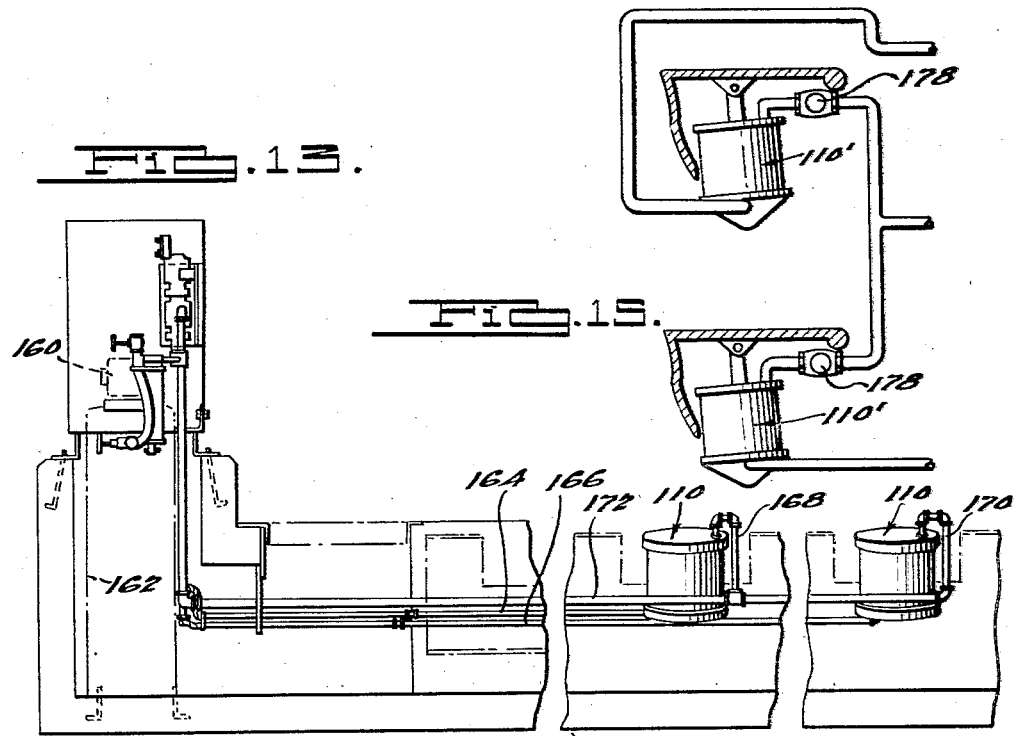
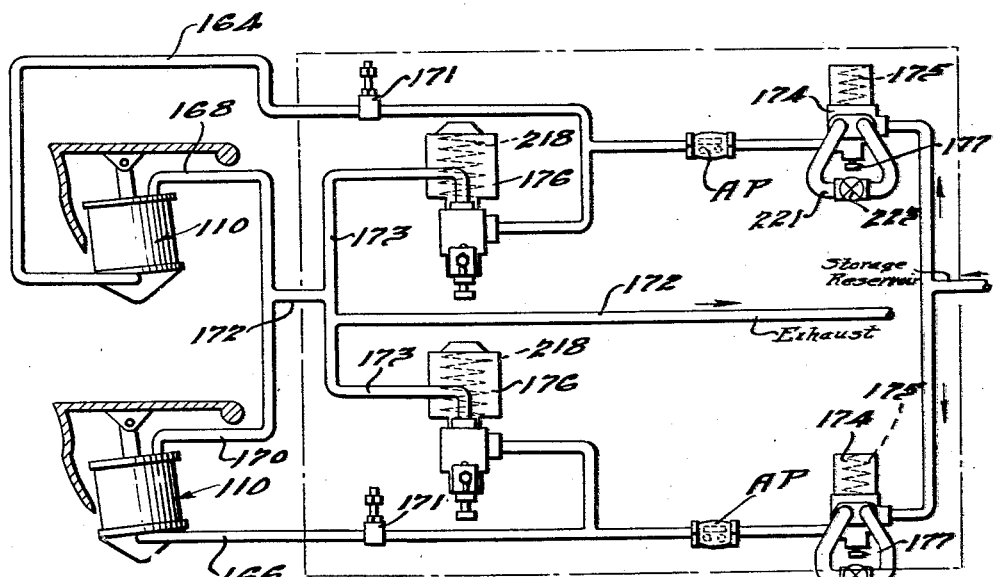

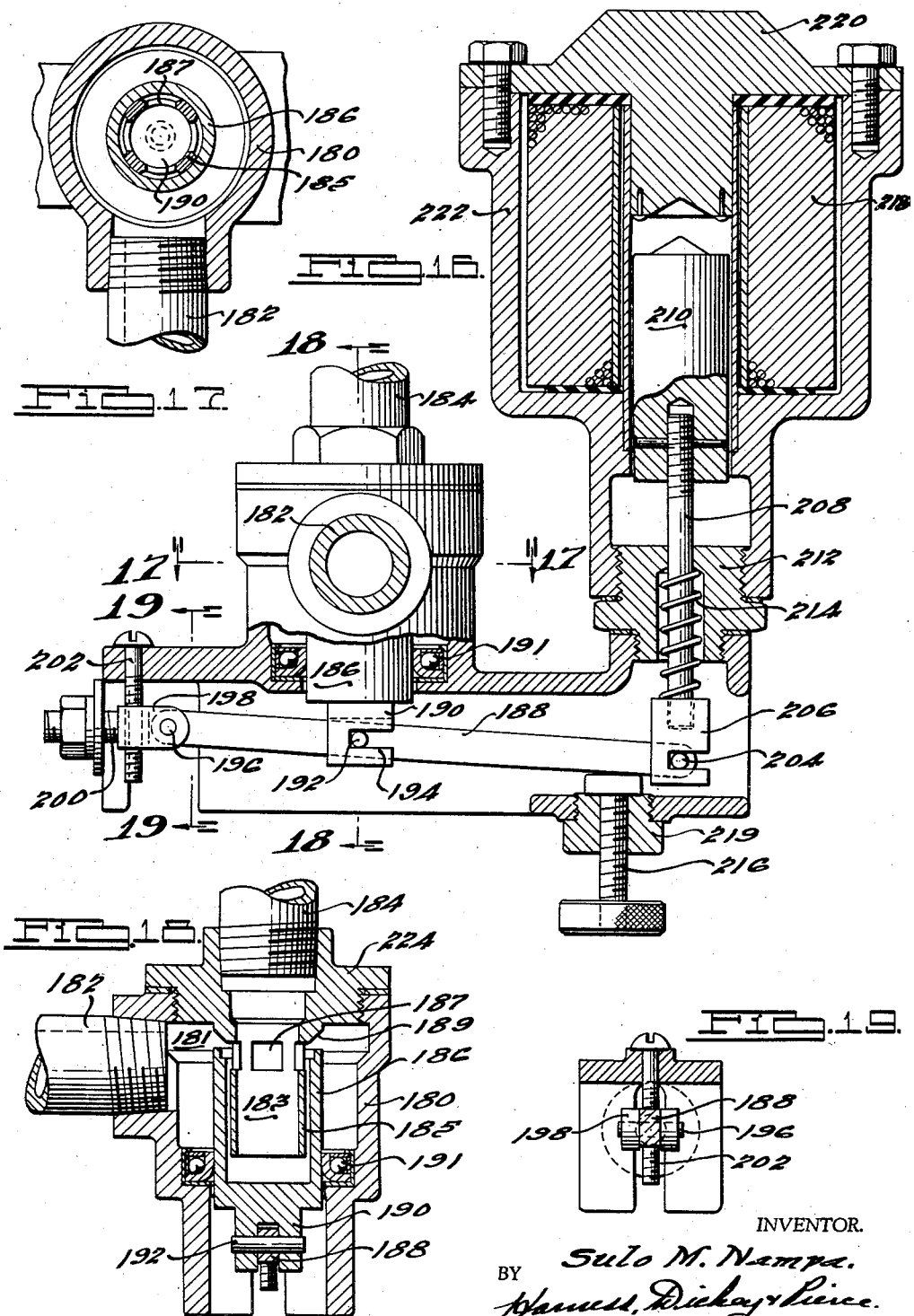

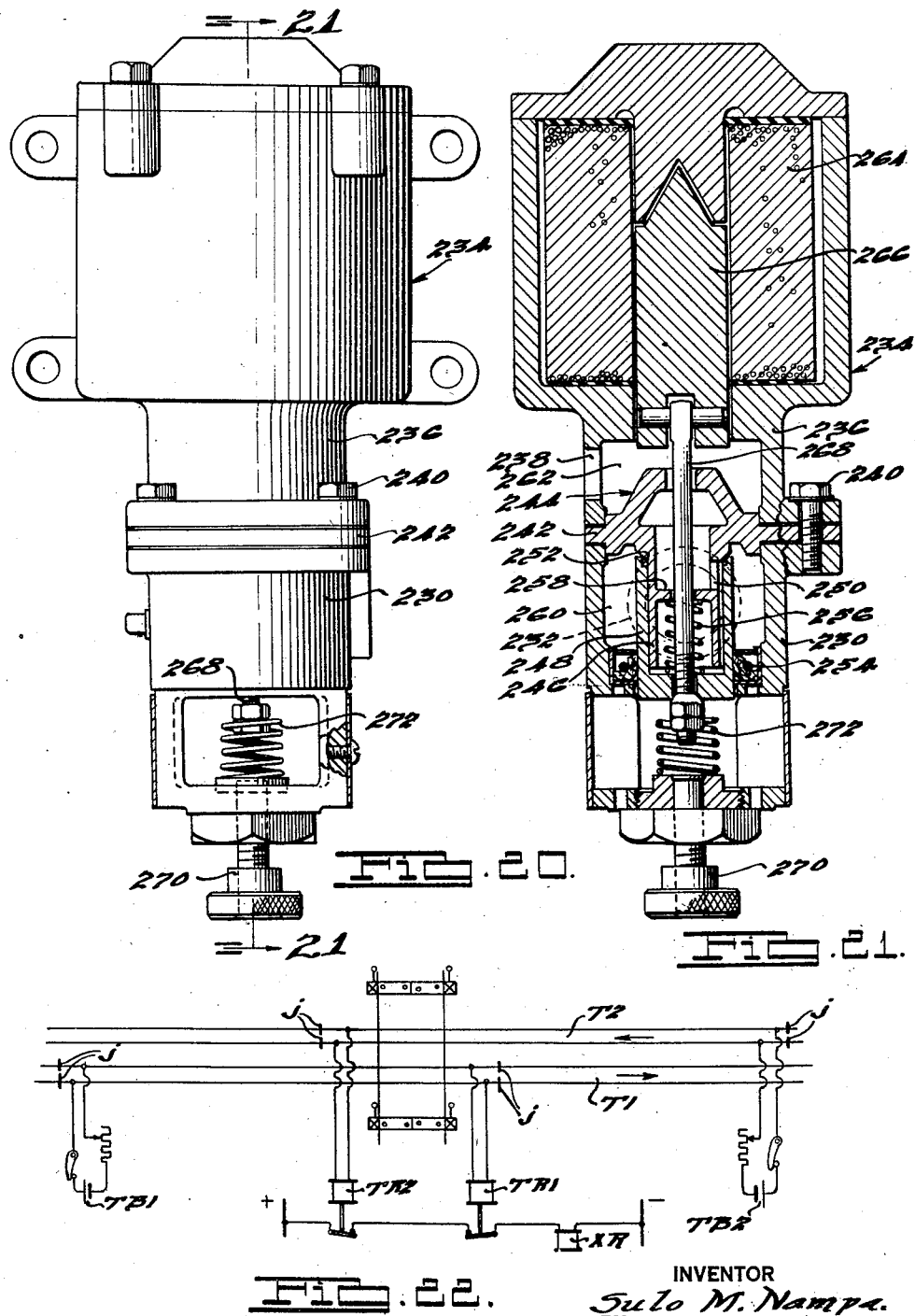

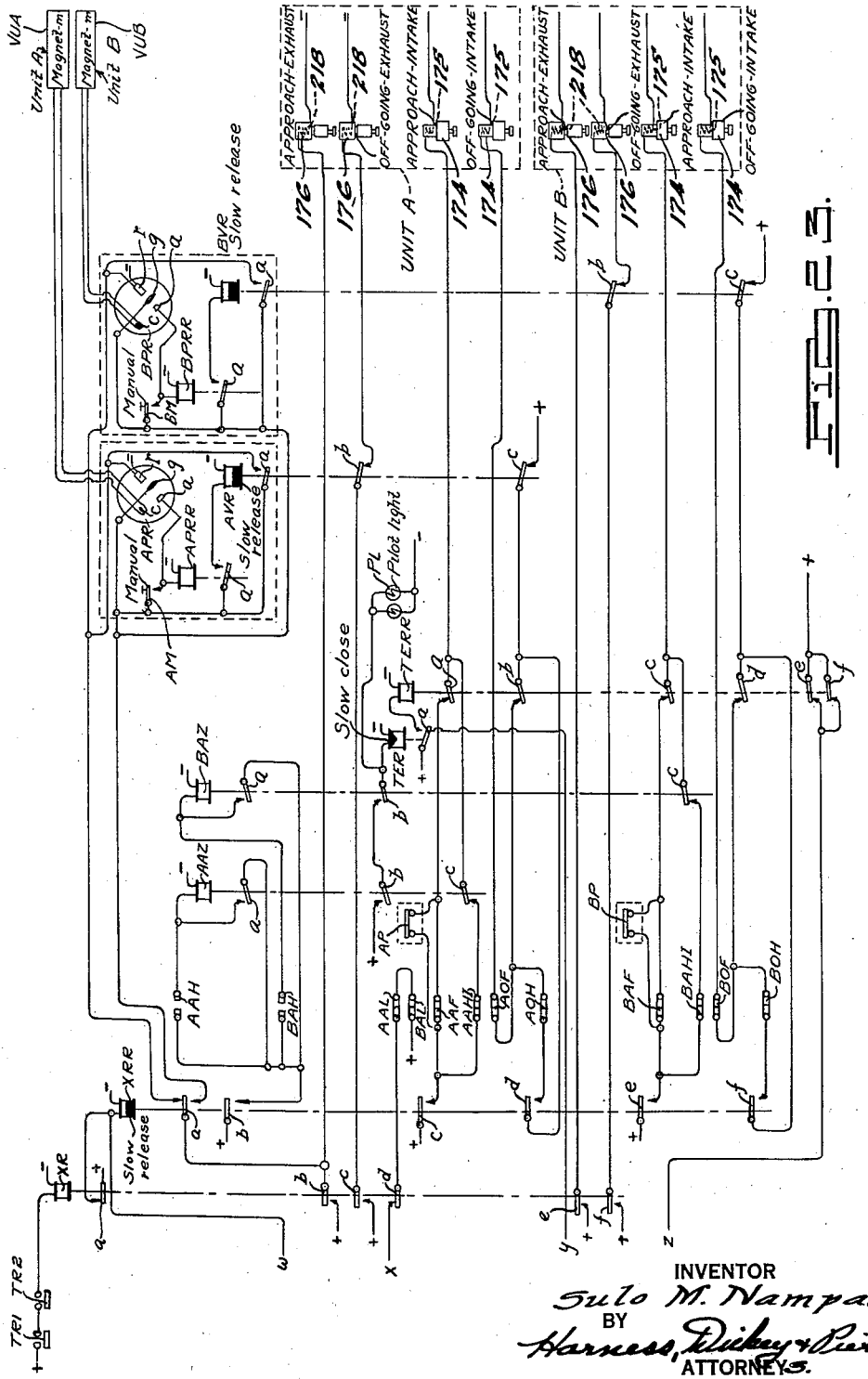

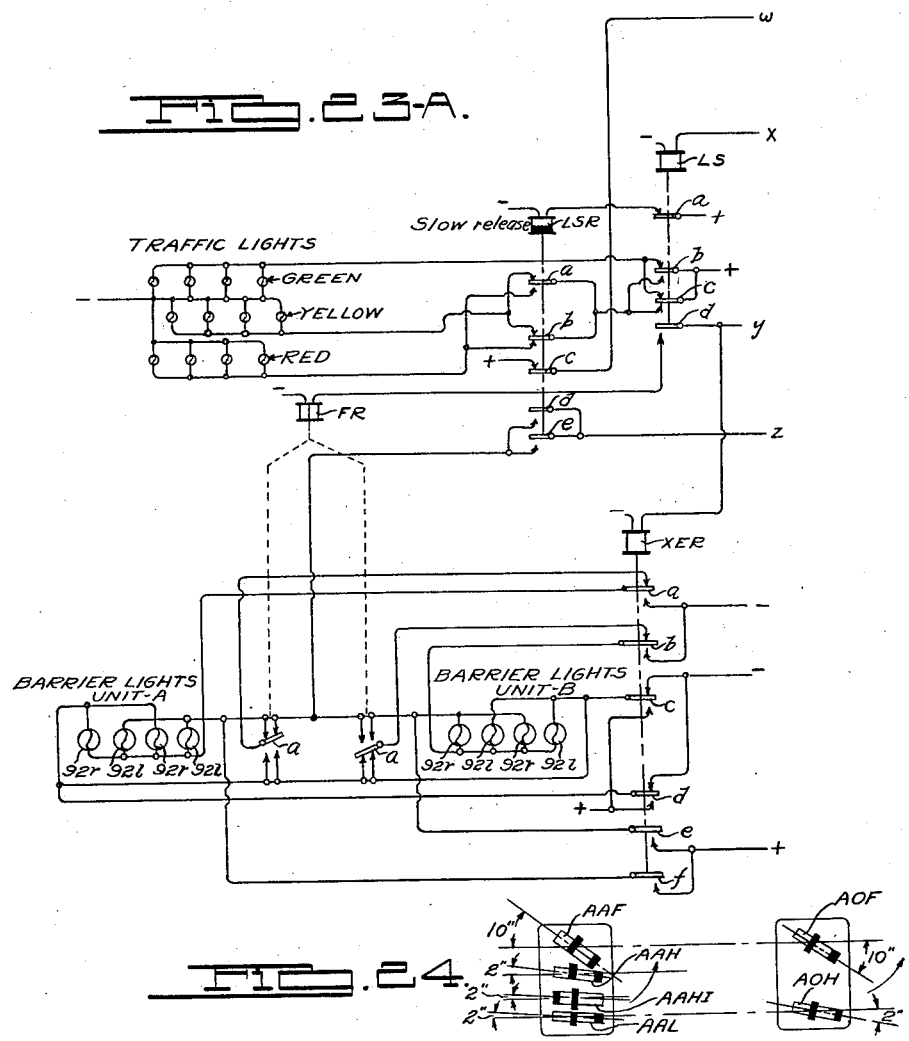

2,327,366

UNITED STATES PATENT OFFICE 2,327,366

CROSSING PROTECTIVE SYSTEM

Sulo M. Nampa, Detroit, Mich., assignor to Grade Crossing Guard Corporation, Memphis, Tenn., a corporation of Tennessee Application August 2, 1940, Serial No. 349,886

22 Claims. (Cl. 39—6)

The present invention relates to crossing protective apparatus of the guard or barrier type, particularly designed for use at roadway intersections, such as at rail highway crossings, street intersections, bridge entrances, and the like.

The principal objects of the present invention are to provide an improved and simplified apparatus of the above character, which embodies relatively few operating and moving parts, which is sufficiently strong to withstand heavy vehicle impacts and is, nevertheless, so constructed as to require relatively simple and light mounting and power means; to provide such apparatus, which is dependable and positive in its action, which is relatively simple and inexpensive to manufacture and install, and which requires relatively simple and infrequent maintenance service; and to provide such apparatus which minimizes injuries to vehicles which strike the barrier surface and which facilitates the relatively free passage of vehicles out of the space between the barriers at the respectively opposite sides of the intersections.

Further objects of the present invention are to provide a protective apparatus of the above character, including one or more barrier members movable from a retracted position to a projected traffic obstructing position by a simple, direct acting motor, which is so constructed and energized that the motor itself cushions the impact forces which the barrier receives from vehicles, or the like, when in service, thereby reducing the required strength, weight and cost of construction of the apparatus; to provide such apparatus in which the motor is so constructed and energized that it exerts a relatively small force in order to gradually move the barrier from the retracted toward the projected position, and which is effective, in the event such movement is obstructed, as by the weight of a vehicle thereon, by ice, or the like, to develop a substantially greater force sufficient to overcome such obstructing force; to provide such an apparatus wherein the just-mentioned substantially greater force is available throughout the full range of movement of the barrier from the retracted to the projected position; to provide such apparatus wherein means are provided to limit the projecting movement of the barrier to a point corresponding to the fully projected position and in which the aforesaid motor acts to resiliently hold the barrier against such limiting means with a force substantially greater than the force normally exerted during the projecting movement; to provide such an apparatus wherein the motor comprises a single acting ram actuated by an elastic fluid, such as air, whereby in all positions of the barrier, the motor elastically or resiliently opposes forces which tend to force the barrier toward the retracted position, the relatively small force exerted by the motor at intermediate positions of the barrier relatively freely permitting such a retracting movement and the relatively large force exerted at the projected position acting to positively yet elastically resist such movements; to provide such apparatus wherein the disposition of each barrier relative to the associated roadway, the pivotal mounting thereof, and the connection between the motor and the barrier are such that the elastic motor acts to absorb and cushion the impact shocks of vehicles against the barrier; and to provide such apparatus having embodied in or associated with the motor shock absorber means to control the rate of rising movement following a depression of the barrier, as by the passage of a vehicle thereover.

Further objects of the present invention are to provide a barrier system of the above character, including improved control means for controlling the actuation of the barrier motor; to provide such apparatus wherein the control means is arranged to interrupt the projecting movements of the barrier for a predetermined interval when the barriers reach a predetermined intermediate or warning position; and to provide such apparatus wherein the control means is arranged so as to automatically lower, for a predetermined interval, the barrier at the offgoing side of a particular traffic line in the event a vehicle occupies a position between the barriers during operation of the system.

Further objects of the present invention are to provide apparatus of the above character, in which the barrier can relatively readily be released from certain of the operating members, so as to enable the barrier to be elevated to a position higher than the projected position thereof, whereby to afford ready access to the interior of the barrier casing for inspection and maintenance purposes; to provide such a construction embodying improved hinging arrangements of simplified construction which efficiently withstand the aforesaid impact shocks and which are particularly adapted for the above abnormal or pull-away movements of the barrier; to provide such a construction wherein the barrier face is provided with a series of openings having removable covers to afford access to the interior of the barrier, whereby to enable the disconnection of the barrier from the said operating members; to provide such a construction embodying improved lighting units carried by the barrier for projecting beams of light from the barrier face, and which lighting units are swingable for purposes of repair and inspection and to afford access to the interior of the barrier for the purposes of the above-mentioned service disconnections; to provide such constructions embodying a relatively simple and readily erected casing structure; to provide such constructions wherein the barrier casing is embedded in a concrete or equivalent body, which is insulated from adjacent pavement panels so that impact shocks directed against the barrier are not transmitted to such adjacent panels; to provide such constructions embodying improved means for ventilating and draining the pit and casing structures; and to provide such constructions embodying improved individual operating elements, including, but not by way of limitation, improved valves for controlling the fluid circuits associated with the motor.

With the above as well as other objects in view, which appear in the following description and in the appended claims, preferred but illustrative embodiments of the present invention are shown in the accompanying drawings, throughout the several views of which corresponding reference characters are used to designate corresponding parts, and in which:

Figure 1 is a perspective view of a typical rail highway installation, embodying the invention;

Fig. 2 is a view in top plan, with certain of the parts broken away, of one of the barrier units shown in Fig. 1;

Fig. 3 is a view in vertical longitudinal section, taken along the line 3—3 of Fig. 2;

Fig. 4 is a view in front elevation of a barrier face;

Fig. 5 is a perspective view showing a barrier in the pull-away or service position;

Fig. 6 is a view in vertical transverse section, taken along the line 6—6 of Fig. 3;

Fig. 7 is a view in vertical transverse section, taken along the line 7—7 of Fig. 4, but showing the barrier in the elevated position;

Fig. 8 is an enlarged detail view of a releasable connection;

Fig. 9 is a fragmentary view, taken along the line 9—9 of Fig. 3;

Fig. 10 is a view in vertical transverse section, corresponding generally to Fig. 9, but showing the associated barrier in the projected position;

Fig. 11 is a fragmentary view in section, taken along the line 11—11 of Fig. 4;

Fig. 12 is a fragmentary plan view, showing a detail of construction of the barrier casing;

Fig. 13 is an outline view, showing certain of the fluid circuits and the control mechanism therefor;

Fig. 14 is a diagrammatic view of the fluid circuits employed in the practice of the invention;

Fig. 15 is a fragmentary view of a modified fluid circuit arrangement;

Fig. 16 is a view in vertical transverse section of an exhaust valve construction embodying the invention;

Fig. 17 is a view in horizontal section, taken along the line 17—17 of Fig. 16;

Fig. 18 is a view in vertical section, taken along the line 18—18 of Fig. 16;

Fig. 19 is a view in vertical section, taken along the line 19—19 of Fig. 16;

Fig. 20 is an outline view of a modified construction of exhaust valve;

Fig. 21 is a view in vertical section, taken along the line 21—21 of Fig. 20;

Fig. 22 is a schematic diagram of a typical track circuit arrangement;

Fig. 23 is a schematic diagram of electrical control circuits, embodying the invention;

Fig. 23a is a schematic diagram which constitutes a continuation of the circuits shown in Fig. 23, the interrupted conductors extending between Figs. 23 and 23a being given corresponding reference characters to show the relation between the two figures;

Fig. 24 is a diagrammatic view of limit switches employed in the practice of the invention; and, Fig. 25 is a tabulation, indicating the operating points of the limit switches shown in Fig. 24.

It will be appreciated from a complete understanding of the present invention that, in a generic sense, the improvements thereof may be embodied in protective systems of widely varying construction and arrangement and specifically adapted for widely differing purposes. The specific embodiments of the invention herein illustrated represent preferred constructions. As previously mentioned, the present invention is frequently applied to rail highway crossings and by way of illustration, the invention is so illustrated in the present application.

Referring particularly to Fig. 1, a typical installation for an intersection between a railway and four-lane highway is shown. In this figure, two barriers are individual to each traffic lane, one barrier of each pair being positioned at the approach side of the railway R and the other barrier of each pair being positioned at the off-going side of the railway. The two approach barriers at each side of the intersection are designated A and the two off-going barriers at each side of the intersection are designated O, it being understood that, except as noted hereinafter, all of the barriers A and O are preferably of duplicate construction, but that, as hereinafter described, the control systems for the approach and off-going barriers differ in certain respects to accommodate the different service conditions to which the approach and off-going barriers are subjected. All of the barriers A and O are embedded in the roadway and normally occupy positions in which the upper surfaces, such as s thereof, lie substantially flush with and thus constitute continuations of the roadway surface. The mountings for the barriers within their associated casings are pivotal, and under the conditions hereinafter specified, the barriers are automatically actuated so as to swing them from the just-mentioned retracted positions to the illustrated projected positions in which the faces f thereof project above the roadway surfaces and constitute obstructions or barrier surfaces for engagement by vehicles approaching the barriers. The barrier faces are preferably formed and dimensioned in accordance with the arrangement disclosed and claimed in Evans Patent No. 2,075,892, granted April 6, 1937, and assigned to the assignee of the present application. The Evans arrangement, briefly, is one wherein the height and form of the barrier faces are such that vehicles striking the barrier faces apply forces which tend to retract the barriers to the retracted positions, the reaction between each barrier and the vehicle, however, being such as to avoid injury to the vehicle occupants.

The operating cycles for the two approach barriers A at each side of the intersection are identical, and while in the broader aspects of the invention such two barriers may be combined into a single unit or may be subdivided into a larger member, the illustrated arrangement employs one such barrier individual to each lane. Both approach barriers at each side of the intersection have a common source of power, certain of the control apparatus wherefor is housed within an associated cabinet c, located in line with, but to one side of the associated barriers. Similar comments apply to the two off-going barriers O at each side of the intersection, which are provided with a common source of power, certain of the elements wherefor are housed within similar cabinets c.

As hereinafter described, the barrier faces f are preferably provided with light sources and with reflecting devices, and in addition, to afford predetermined warnings as to the condition of the intersection, it is preferred to provide usual traffic lights, which may be carried upon standards l mounted upon the cabinets c.

In rail highway installations, it is preferred to have the barriers automatically respond to the approach of trains to the intersection, and the hereinafter described electrical control system for effecting this response may be housed in an additional cabinet e positioned at one side of the intersection. The conduit system extending between the cabinet e, the individual cabinets c, and the individual barriers is indicated generally by the dotted lines in Fig. 1.

Referring now more particularly to Figs. 2 through 12, the details of construction of the individual barriers and the casings therefor are shown in detail, it being appreciated, as previously mentioned, that constructions of the barriers and the casings for both the approach and off-going lines are the same. Each barrier is of elongated form, generally triangular in cross-section, having the previously mentioned surface, such as s, and the previously mentioned face f. The ends of each barrier are closed by end plates 30. Each barrier may be and preferably is formed as a casting, and the interior thereof is provided with reinforcing members, such as the intermediate plates 32 and the longitudinal ribs 34.

Each barrier casing is preferably built up of standard structural sections, comprising the two longitudinally extending laterally spaced members 36 and 38. The members 36 and 38 are received within a reinforced concrete or equivalent pit 40, which pit 40, in turn, is insulated from the adjacent pavement panels 42 by means of the usual highway expansion joints 44, which joints have the effect, as will be understood, of preventing the impact shocks to which the barriers are subjected, from being transmitted to and damaging the adjacent pavement panels 42. The front and rear structural sections, such as 36 and 38, one of each of which is preferably provided for each pair of barriers, are maintained in spaced relation to each other by a plurality of longitudinally distributed connecting members, such as the plate 58, shown in Fig. 6, and it will be appreciated, therefore, that the entire casing and pit structure can be economically manufactured and installed.

When the barriers are in their normal or retracted positions, it is preferred to provide a continuous seal between each barrier and its associated casing or pit, and for this purpose, rubber or other resilient sealing strips 46 (Fig. 6) are secured at respectively opposite sides of the pit, between the sill members 48 and 50, which latter members, in turn, are supported by the concrete panel 40, and are maintained in assembled relation to each other by end connections, comprising the reinforcing bars 60 (Fig. 12). Similar sealing strips 52 (Fig. 3) are secured to that end of each barrier which is adjacent the end of the associated pit. In order to form a seal between the adjacent ends of two immediately adjacent individual barriers, such as the two approach barriers at either side of the intersection, one of such barriers is provided with a sealing strip 54 (Fig. 3) which engages a bead, such as 56, which projects from the end of the immediately adjacent barrier. The rubber sealing strips do not interfere with the relatively free movements of the barriers between the projected and retracted positions, but form a sufficiently tight joint between the individual barriers and between the barriers and the casings to largely prevent the entrance of water or dirt into the barrier pits. Such pits are, of course, preferably provided with drainage means and such pits are also preferably ventilated. For the latter purpose, vents, such as v (Fig. 1) are provided each side of the intersection, which vents communicate, as will be understood, with the interiors of the casings for the associated pairs of barriers.

Each barrier is pivotally supported within its associated casing by means of a plurality of pairs of main hinges 62 and a corresponding plurality of auxiliary hinges 64. As shown, four pairs of main and auxiliary hinges are employed. Each main hinge comprises a relatively heavy hinge pin 66, which may be and preferably is cast integral with the associated supporting bracket 68, which bracket, in turn, is secured to the inner surface of the associated barrier as by a plurality of studs 70. Under normal operating conditions, each pin 66 is received in a semi-cylindrical seat 72 provided in a block 74, which block 74, in turn, is removably secured to the casing section 38.

Each auxiliary hinge comprises a clevis 76, which is removably secured to the inner surface of the associated barrier by a plurality of studs, such as 78, and an eye 80, which is secured to the associated bracket 75. Each clevis 76 and its associated eye 80 are pivotally but loosely connected together by a pin 82.

It will be appreciated that the auxiliary hinges function primarily to positively prevent the associated barrier from being displaced from its casing. By virtue of the relatively loose fit between the elements of each auxiliary hinge, however, all loads applied to the barrier are transmitted to the casing directly through the main hinge pins 66 and the blocks 74. Consequently, the auxiliary hinges can be of relatively light construction.

When each barrier is in its normal or retracted position, shown in Figs. 3 and 9, the forward ones of the previously mentioned longitudinal stiffening ribs 34 rest upon the forward casing sections 36. In order to silence the retracting movements of each barrier, as well as to give some resilience to the barrier mounting, the just-mentioned casing section 36 is preferably provided with pads such as 84 (Fig. 10), formed of rubber or other resilient material, upon which the barrier rests when retracted.

Referring particularly to Fig. 4, the forward face of each barrier is preferably provided with lettering, which may be outlined by usual bull's eyes 90, which reflect the light directed against the barrier faces by on-coming vehicles to give suitable warning. Also, each barrier face is preferably provided, adjacent either end thereof, with a lighting fixture designated as a whole in Figs. 4 and 7 by the reference character 92. In Fig. 1, the lights are diagrammatically shown, those at the left ends of the barrier being designated 92—*l* and those at the right hand ends being designated 92—*r*. Each lighting fixture comprises generally a lens 94 and an enclosing reflector shell 96, which are mounted upon a bracket 98. The bracket 98, in turn, is pivotally connected to the inner surface of the barrier face by means of a pin 100. In order to protect the lamp associated with each lighting unit from the effect of impacts against the barrier, a rubber block 102 or other resilient element is preferably interposed between each shell 96 and bracket 98. The bracket 98 is releasably connected to the barrier by means of studs 99, so that under normal operating conditions, it is rigid with respect to the barrier.

Each barrier face *f* is provided with a generally rectangular opening 97 (Fig. 7), which is large enough to accommodate the swinging movement of the associated lighting unit 92 from the full line position to the dotted line position. In order to protect each light unit, each such opening 97 is provided with a removable molding 95, having a circular opening in the face thereof, which molding is removably held in place by studs 93.

It will be appreciated, therefore, that if it is desired to inspect or repair one of the lighting units 92, or if it is desired to obtain access to the interior of the barrier for the hereinafter described pull-away operation, the studs 93 may be loosened, after which the moldings 95 may be removed. Upon removal of the moldings 95, the previously mentioned studs 99 are accessible and by removing these studs, the corresponding light unit may be bodily swung to the dotted line position in Fig. 7.

In accordance with the present invention, the motive means for elevating each barrier from its retracted position to the projected position comprises a single fluid pressure operated ram individual to each barrier, and a feature of particular importance resides in the use of an elastic fluid, such as air, as the actuating means for each ram.

It is recognized that fluid pressure operated rams have heretofore been proposed for operating various types of protective devices, attention being invited, for example, to the disclosures in patents such as Pace Patent No. 1,530,056, granted March 17, 1925, and Gibson Patent No. 1,533,850, granted April 14, 1925. So far as the present applicant is aware, however, he is the first to propose the use of a ram, actuated by an elastic fluid, such as air, wherein the barrier mountings and the connections between each barrier and its ram are such that the rams are utilized to absorb in part, at least, the shocks occasioned by vehicles striking the barrier. As aforesaid, this particular feature, in addition to lessening the shock transmitted to the vehicle, enables the use of very materially lighter and simpler barrier mountings and ram connections. Moreover, so far as the present applicant is aware, he is the first to provide a system employing an elastic fluid operated ram as a source of power, wherein the impact forces of vehicles oppose the force exerted by the elastic fluid and wherein the arrangement is such that vehicles passing over the barriers under certain conditions are enabled to depress the barriers against the force of the elastic fluid. This characteristic enables vehicles to relatively freely pass over the barriers under certain conditions. Further, the use of an elastic fluid as the actuating medium makes it possible to apply widely varying lifting forces to the barriers to take care of a variety of abnormal operating conditions discussed below.

Each ram, designated as a whole as 110, is illustrated as being of single acting construction, having a cylinder 112, which slidably receives a piston 114, which piston, in turn, is provided with a piston rod 116. The end of each piston rod is connected to a clevis 117, integral with the associated barrier, by a pin 118. The lower end of each ram cylinder 112 is provided with a pair of spaced eyelets 120, which are connected to transversely spaced clevises 122 by means of pins 124. The clevises 122 are rigidly secured to and may be formed integrally with a transverse bracket 126, which extends between and is rigidly connected to the front and rear casing sections 36 and 38. With this relation, each ram can have pivotal movement relative to the associated barrier casing and also relative to the associated barrier, and it will be understood that upon the introduction of the actuating fluid into the cylinder space beneath the ram piston, the piston is forced upwardly and consequently swings the associated barrier from the retracted position of Fig. 9 toward the fully projected position of Fig. 10. Upon the release of such fluid pressure, in turn, the corresponding barrier returns by gravity to the retracted position.

As described in connection with Figs. 13 and 14, each ram is provided with an inlet connection which opens into the space beneath the associated piston and is also provided with an unobstructed exhaust connection, which communicates directly with the cylinder space at the upper side of the piston. With such an arrangement, the individual rams 110 are not effective to impose a limit upon the rate of upward rise of the associated barrier, and it is, therefore, preferred to provide the barrier with snubbers or shock absorbers, which, while not interfering in any way with the rate at which the barriers may be depressed, are effective to limit the rates at which the barriers rise. In the present instance, each barrier is provided with two such shock absorbers 140, which are symmetrically arranged adjacent the respectively opposite ends of the barrier. Each shock absorber 140, which may be of conventional construction, comprises a main body 142, which is rigidly connected by a bracket 144 to the associated casing section 38. Each shock absorber also comprises an articulated arm, having the links 146 and 148 connected, respectively, to the moving element within the shock absorber body and to the barrier. In the present instance, also, the shock absorbers 140 are arranged to form positive limit stops to the projecting movements of the barriers and for this purpose, the forward casing section 36 of each barrier is provided with a pair of brackets 141 (Fig. 6) which project into the path of movement of the arms 146 and are engaged by such arms when the barrier reaches the fully projected position.

As hereinafter described, particularly in connection with the description of Figs. 23 and 23*a*, the control system for the barrier is preferably such that upon the approach to the associated intersection of a train, each ram is gradually supplied with elastic fluid. The proportions of the ram are preferably such that under normal conditions, a relatively low pressure in each ram of the order, for example, of about ten pounds per square inch, is sufficient to cause the associated barrier to start and move upwardly at a gradual speed. The control system is further such that when each barrier reaches an intermediate or warning height, which height may be and preferably is approximately 40% of the fully projected height of the barrier, the supply of pressure is cut off for a predetermined interval and is then again turned on, so as to cause the barrier to resume its upward movement. When each barrier reaches its fully elevated position, it is stopped by the shock absorbers 140, as mentioned above.

The hereinafter described source of pressure for the rams is preferably arranged to provide a pressure substantially in excess of the pressure normally required to elevate each barrier. For example, assuming that the proportioning of the parts is such that a pressure of ten pounds per square inch is normally sufficient to elevate the barriers, it is preferred to have available a pressure of about 125 pounds per square inch. This relatively high pressure serves a variety of important purposes.

It will be appreciated that the barriers may frequently start their upward movements at a time when approaching vehicles are too close thereto to enable a full stop before reaching the barrier for the corresponding line. Under such circumstances, it is to be expected that such vehicles will pass over the barriers. Under the conditions stated, it is preferred that the vehicles be able to depress the barriers relatively readily. The previously mentioned normal elevating pressure is just sufficient to provide a gradual lifting movement, and it will be appreciated, therefore, that a vehicle in passing over the barrier can quickly depress the same to the retracted position. The just-mentioned depressing movement which may occur at any stage of the lifting movement, does not alter the position of the valves associated with each ram and consequently serves to increase the pressure in each ram. As a consequence, as soon as the vehicle in question passes beyond the barrier, the thus increased pressure becomes effective to re-elevate the barrier to the position occupied by it immediately before the impact of the vehicle, the rate of such rising movement being held to a safe value by the shock absorbers 140.

As hereinafter described, it may occur from time to time that a vehicle will occupy the space between the barriers at respectively opposite sides of an intersection at a time when the barriers are elevated, and the control system is so arranged as to automatically lower the corresponding off-going barriers for a predetermined interval, under these conditions. To take care of those instances in which the thus trapped vehicle may fail to clear the intersection during the just-mentioned interval, it is preferred to cut off the pressure for the off-going barriers when they reach the fully elevated position, so that such barriers may be readily depressed at all times by vehicles approaching the same from the rear. It is preferred, however, to positively but resiliently hold the approach barriers in the fully elevated positions. This feature is readily afforded by the present elastic fluid operated rams, since when the approach barriers reach the fully elevated positions, the pressure is maintained thereon and is allowed to build up to a higher or locking value of, for example, 30 pounds per square inch, which pressure is found adequate for practical purposes.

It may also frequently occur that an abnormal force is required to elevate a barrier. For example, during the winter months, ice may form around the joint between each barrier and its casing or a heavy layer of ice may be deposited on top of each barrier and on top of the adjacent road surface. Also, it may happen that at the time a ram is initially actuated, a heavy object, such as a truck, will have its wheels resting upon a barrier. In any of these events, the previously described relatively low elevating pressure is insufficient to elevate the corresponding barrier. With the present elastic actuating fluid, however, the pressure continues to build up in each ram and finally reaches a value sufficient to "break loose" the obstructed barrier. As previously mentioned, it is preferred to have available a pressure of approximately 125 pounds per square inch and this pressure is found adequate to relatively quickly break loose an obstructed barrier under the most severe operating conditions.

As soon as the obstructed barrier is broken loose, the pressure built up in the associated ram tends to cause the barrier to rapidly rise. However, because of the relatively large diameter of the ram, a relatively small upward movement of the ram is again effective to dissipate such relatively high pressure and bring the pressure acting against the piston to a value only sufficient to cause a safe rate of rise of the barrier. Also, under these conditions, the previously mentioned snubbers act to limit the rate of rise of the barrier to a safe value.

The just mentioned additional force commensurate with that required to effect the desired elevating movement of the barriers is, as will be appreciated, available at any stage of the barrier movement.

It will be appreciated that in the broader aspects of the invention, various fluid circuits may be provided for supplying and exhausting the several rams, a preferred arrangement being shown in Figs. 13 and 14. Referring particularly to Fig. 13, a compressor and storage unit is provided individual to each pair of approach and off-going barriers A and O, which compressor and storage unit is preferably housed within the previously mentioned cabinet c (Fig. 1). In the present system, therefore, four such units are provided for the complete installation. Each compressor and storage unit may comprise a conventional motor driven compressor 160, mounted upon a conventional storage tank 162. It will be understood, also, that conventional means (not shown) may be associated with the compressor motor, so as to automatically maintain a predetermined pressure within the storage tank 162 and it is preferred that the capacity of the tank 162 be considerably in excess of the normal operating requirements of the associated rams.

The two rams 110, shown in Fig. 13, are preferably individual, respectively, to the barriers of a corresponding pair, such as the two approach barriers at one side of the intersection, and these rams are provided with supply lines 164 and 166, respectively, which extend into the cabinet c and are connected through the hereinafter described valves to the storage tank. The rams 110 are also preferably provided with exhaust connections 168 and 170, to the low pressure sides thereof, so as to vent any air which escapes past the associated pistons. The vent connections 168 and 170 are connected to exhaust through a common line 172.

Referring particularly to Fig. 14, the piping connections for the rams and the associated control valves are schematically shown. Each ram 110 is provided with a solenoid-operated normally closed intake valve 174 and is also provided with a solenoid-operated normally open exhaust valve 176. Under normal conditions, the valves 174 being closed and the valves 176 being open, it will be understood that both rams 110 are disconnected from the storage reservoir 162. Both the high pressure and low pressure sides of each ram are connected directly to exhaust, as aforesaid, the low pressure sides being connected thereto through the lines 168, 170 and 172, and the high pressure sides being connected thereto through the lines 164 and 166, respectively, and the corresponding exhaust valves 176. As hereinafter described, the approach of a train to the crossing in question initiates a series of operations which first closes both exhaust valves 176 and thereafter, at the expiration of a predetermined interval, opens both intake valves 174. These two operations connect both rams to the storage reservoir and disconnects both rams from the exhaust line, thereby initiating the elevating movements of the barriers. As also described below, upon the arrival of the barriers at the intermediate or warning positions, the intake valves 174 are closed for a predetermined interval without altering the positions of the exhaust valves. This operation interrupts the introduction of further air into the rams, but does not dissipate the previously developed pressure. Consequently, the rams remain stationary at the warning position until such time as the intake valves are again opened, at which time the barriers continue their upward movements and finally reach the fully projected positions. When the latter positions are reached, the engagement of each snubber arm 146 with its associated bracket 141 interrupts further movement. In respect to the off-going rams, the intake valves are automatically closed when the fully projected positions are reached, thereby maintaining these rams at the relatively low or normal elevating pressures. The intake valves for the approach barriers are not closed at the projected position until a holding or locking pressure, previously mentioned, is built up therein, which locking pressure is substantially in excess of the normal elevating pressure.

In the event of failure of the compressor system, it may be desirable to provide for manual or other auxiliary operation of the rams, and, as shown, adapters 171 may be interposed in the lines 164 and 166 to permit a pump or other auxiliary source to be connected into such lines.

As hereinafter described, as soon as the train in question clears the intersection, both exhaust valves are de-energized and thereupon resume the open position, immediately connecting both rams to exhaust and allowing the associated barriers to drop to the retracted positions under the influence of gravity.

As previously mentioned, the fluid connections between each ram and the associated storage tank 162 are preferably such as to normally permit only a gradual flow of air into the associated ram, which gradual rate of flow is preferably only sufficient to elevate the corresponding barrier, when the latter is unobstructed, at approximately the same rate for which the snubbers 140 are set. Thus, the snubbers do not materially modify the rate at which the air is enabled to lift an unobstructed barrier, and serve principally to limit the rate at which the barriers re-rise after a depressing movement, occasioned, for example, by the passage of a vehicle thereover. Various means may be employed to meter the flow of air between the storage tanks and the individual rams, but in the present instance, this control is afforded by the intake valves 174, which valves are preferably provided with orifice adjustments, indicated at 177. The adjustments 177 are preferably arranged to afford a relatively wide range of adjustment, so that, if desired, a substantially unimpeded flow through the valves 174 may be provided to thereby quickly subject the rams to the full reservoir pressure.

In the arrangement just described with reference to Fig. 14, the vent connections from the low pressure sides of the rams are unobstructed so that the rams 110 have no snubbing characteristics, it being preferred, as previously mentioned, to employ the shock absorbers 140 (Figs. 2 and 3). In a modified embodiment of the invention, the just-mentioned vent connections from the low pressure sides of the rams may be provided with metering orifices, so that the rams themselves perform the functions of the snubbers 140. Such an arrangement is shown in Fig. 15, in which the vent connections from the rams 110' are provided with metering valves 178. In all other respects, the arrangement of Fig. 15 may and preferably does correspond to the arrangement of Fig. 14.

In the broader aspects of the invention, the various control valves may be constructed in any suitable way. Preferred constructions of exhaust valves are, however, shown in Figs. 16 through 19 and in Figs. 20 and 21. Referring particularly to Figs. 16 through 19, each exhaust valve 176 preferably comprises a casing 180, having an inlet 182 and an outlet 184. The interior of the casing 180 is divided into an annular chamber 181 and a circular chamber 183 by means of a tubular member 185, carried by and projecting downwardly from the removable cover 224, associated with the valve body 180. Inlet 182 opens directly into the chamber 181 and the outlet 184 communicates directly with the chamber 183, communication between the chambers 181 and 183 being afforded by a series of circumferentially distributed openings 187 in the tubular member 185, immediately below the valve seat 189 thereof.

Each casing 180 receives an upwardly presenting cup-shaped valve 186, which is freely slidable upon the tubular member 185. In the closed position of the valve, the upper end of the valve element 186 seats against the valve seat 189, thereby closing off the openings 187. In the open or normal position of the valve, the valve element 186 occupies the illustrated position, in which it exposes the openings 187, thereby permitting a substantially unrestricted flow through the valve.

The lower end of the valve element 186 projects downwardly out of the chamber 181, being provided with a usual sealing gasket 191, and terminates in a clevis 190, which embraces the operating lever 188. A pin 192 which projects from the opposite sides of the lever 188 is received in notches 194 cut into the respective legs of the clevis 190.

One end of the lever 188 is pivotally and adjustably connected to the valve structure by means of a pin 196, which is connected to a clevis 198. The clevis 198 is transversely and vertically adjustable by means of studs 200 and 202. The other end of the lever 188 is connected by means of a pin 204 to a clevis 206, which is carried at the lower end of the push rod 208, associated with the armature 210 of the actuating solenoid for the valve. The push rod 208 passes upwardly through a sleeve structure 212, and is provided with a compression spring 214, which continuously urges it downwardly to the position shown in Fig. 16, which position, as previously mentioned, corresponds to the open position of the valve. The valve solenoid is of usual construction, having a coil 218, wound upon a suitable magnetic circuit, comprising the core-piece 220 and the outer body 222 of the solenoid. With this arrangement, it will be appreciated that upon energization of the coil 218, the armature is elevated into engagement with the core-piece 220, which movement correspondingly rocks the lever 188 in a counter-clockwise direction and moves the valve element 186 upwardly to the closed position. Upon de-energization of the coil 218, in turn, the spring 214 is effective to move the armature downwardly, restoring the valve to the normally open position.

It will be noticed that the solenoid structure is readily removable from the valve structure, thus facilitating repair and replacement work. It will further be noticed that the lever 188 is readily disconnectable both from the valve element and from the solenoid armature and that, in turn, the cover 224 of the valve is removable, so as to permit removal of the valve element from the top for purposes of inspection and repair.

Under certain circumstances, such as in the event of failure of the power for energizing the solenoids of the various control valves, it is desirable to enable these valves to be manually controlled. For this purpose, each valve 176 is preferably provided with a manual operating member comprising the screw 216, which is threaded into a removable boss 219, which, in turn, is threaded into the bottom of the valve structure. The member 216 is normally turned downwardly to the position indicated in Fig. 16, in which it does not interfere with the movement of the lever 188 to the open position. It will be appreciated, however, that by turning the member 216 into the valve body, the lever 188 is rocked in the same manner as is effected by energizing the solenoids 218, thereby closing the valve. Referring again to Fig. 14, similar manual control of the intake valves may be provided by employing the by-pass connections, indicated at 221, which connections are provided with manually controlled valves 223. It will be understood that these valves are normally closed, but that they may be manually opened to complete the by-pass connections around the associated intake valves 174.

Referring particularly to Figs. 20 and 21, the modified exhaust valve construction comprises a housing 230, having an inlet port opening thereinto and which may correspond, of course, to the inlet 182 of the construction of Figs. 16 through 19. The valve also comprises a solenoid structure, designated as a whole as 234, the lower end 236 whereof is of cylindrical form, and has a plurality of exhaust openings 238 distributed therearound. The housing 230 and the solenoid structure 234 are held in assembled relation to each other by a plurality of circumferentially arranged studs 240, and clamp between them the flange 242 of the valve member 244.

The valve member 244 has a cylindrical portion 246, over which the cup-shaped valve element 248 is slidably received in the relation described with reference to Figs. 16 through 19. Also, the cylindrical member 246 is provided adjacent its upper end with a plurality of circumferentially distributed openings 250, and is also provided with a tapered valve seat 252, which cooperates, as before, with the upper end of the valve element 248. A gasket 254 is interposed between the housing 230 and the lower end of the valve element 248 to seal the joint therebetween.

A compression spring 256 is seated between the base of the cup-shaped valve element 248 and a flange 258, which extends inwardly from the walls of the member 246 and this spring normally urges the valve element to its lower open position, in which the openings 250 are exposed. Under these conditions, the chamber 260, into which the inlet 232 opens, communicates, through the openings 250, with the chamber 262, which latter chamber is continuously open to atmosphere through the ports 238. If the valve solenoid 264 is energized, however, the armature 266 is drawn upwardly and, through the push rod 268, this action elevates the valve element 248 to its illustrated upper position, in which it seats against the seat 252, and closes the ports 250. The latter action isolates the chambers 260 and 262 from each other, thereby closing the valve. As in the previous case, a manually operable member 270 is provided, which upon being turned into the valve body, acts, through the relatively heavy spring 272, to elevate the valve element 248 to the closed position. It will be understood that the element 270 is normally turned downwardly to a position in which the spring 272 either freely abuts or is spaced below the lower end of the valve element 248, so as to not interfere with the movements thereof to the open position.

It will be appreciated that the just-described valve construction can be used instead of the previously described construction, the only difference being that the pipe connections 173 of Fig. 14 are not needed.

In the broader aspects of the invention, various different specific electrical control systems can be utilized to produce the above generally described and the hereinafter more specifically described control operations. A preferred such control system is shown in Figs. 23 and 23a, the mechanical elements of which system, with the exception of the solenoid operated valves, are preferably housed within the previously described cabinet c (Fig. 1).

The system of Figs. 23 and 23a comprises generally a pair of principal relays XR and XRR, which respond to the approach of a train to the intersection in question and which are common to all barriers at the intersection independently of the number of such barriers. The system further comprises a series of three relays LS, LSR and XER, which control the traffic lights and the barrier lights. The arrangement is such that all barrier and traffic lights operate alike, respectively, so that the just-enumerated relays are also common to all barriers at an intersection, independently of the number of such barriers. Further, the system comprises a pair of vehicle operated units VUA and VUB, which respond, as hereinafter described, to the passage of vehicles, in respectively opposite directions, through the space between the barriers at respectively opposite sides of the intersection. Two such units, one for each direction of vehicle travel, are preferably employed at each intersection, independently of the number of barriers at such intersection. The remaining control relays and limit switches employed in the control system of Figs. 23 and 23a are individual, respectively, to each barrier, those for all approach barriers being similarly arranged, and those for all off-going barriers being similarly arranged. Under these circumstances, and in order to simplify the showing of Figs. 23 and 23a, only sufficient individual elements for one off-going barrier and one approach barrier at each side of the intersection are shown, it being understood that the other approach barrier and the other off-going barrier at each side of the intersection (Fig. 1) are provided with similar individual control elements.

To simplify the further description and to aid in identifying the various elements in Figs. 23 and 23a, the barriers at one side of the intersection are designated collectively as unit A, and the barriers at the other side of the intersection are designated collectively as unit B. In Figs. 23 and 23a, also, all control elements identified by the initial letter A or B, respectively, are associated with unit A or unit B, and all control elements having the second identifying letter A or O, respectively, are identified with an approach barrier or an off-going barrier for the unit associated with the initial identifying letter.

Referring particularly to Figs. 23 and 23a, the various intake and exhaust valves are diagrammatically shown at the righthand side of Fig. 23, and are given the same reference characters as are applied to the corresponding elements in Fig. 14, it being understood that each approach barrier of each of units A and B is provided with one exhaust valve 176 and with one intake valve 174, the closed and open positions whereof govern the movements of the associated individual rams 110 (Fig. 14).

The traffic lights are shown in Fig. 23a, under the legend "Traffic lights," it being noted that these lights comprise four green lights, four yellow lights, and four red lights, there being one yellow light, one red light and one green light provided on each of the previously described traffic light standards. The barrier lights are shown in Fig. 23a, under the legend "Barrier lights," it being noted that these lights are given the same reference characters as are applied thereto in Fig. 1, and there being two such barrier lights for each barrier.

In the present system, a plurality of limit switches are employed which respond to the positions of the associated barriers, there being one set of such limit switches for each barrier. The limit switches may be and preferably are of a conventional mercury operated type, which in certain positions complete or interrupt a circuit therethrough and which, if tilted, open or close such circuit and maintain the same open or closed until the switch is restored to the original position. Switches of this type are shown diagrammatically in Fig. 24. All of the switches for each individual barrier may be and preferably are disposed in a relatively light casing, one of which is shown in Figs. 2 and 3, and is designated limit switch. It will be understood that the limit switch is secured directly to the associated barrier and is gradually tilted as the associated barrier rises and falls. The limit switches for the approach barrier of unit A are designated, respectively, AAH, AAL, AAF and AAHI, which limit switches occupy the open and closed positions, designated in Fig. 25. The limit switches for the approach barrier of unit B bear similar reference characters except that, as aforementioned, the initial letter A in each previously mentioned switch is replaced by the letter B. The limit switches for the off-going barriers of units A and B, respectively, are designated AOH and AOF, and BOH and BOF, respectively, which switches occupy the open and closed positions specified in Fig. 25.

In the present system, an operating sequence is initiated by de-energizing the aforementioned normally energized principal control relay XR of Fig. 23, and the sequence is terminated by re-energizing this relay. Stated in another way, the arrangement is such that relay XR is de-energized as soon as a train approaches within a predetermined distance of the intersection and remains de-energized until the train passes a point a predetermined distance beyond the intersection, at which time the relay XR is re-energized. Any of a variety of conventional track control systems may be utilized to effect the just-mentioned energization and de-energization of relay XR, an illustrative such system being shown in Fig. 22.

In Fig. 22, the track T1, on which traffic moves in the direction indicated by the arrow, is provided with a block section defined by rail joints j, which section is provided with a source of track circuit energy, indicated as a battery TB1, and is also provided with a track relay TR1. The other track T2 is similarly provided, the individual elements of which bear the subscript 2 instead of 1. It will be appreciated that so long as no train occupies either track section, the relays TR2 and TR1 are energized and maintain the associated contacts closed, thereby completing a series circuit for the relay XR. If, however, a train enters either track section, the corresponding relay TR1 or TR2 becomes de-energized and remains so until the train leaves the corresponding section. The de-energization of either or both of relays TR1 and TR2 de-energizes relay XR and maintains the same de-energized until both track sections are again clear of rail traffic.

In Figs. 23 and 23a, the positive and negative terminals of each individual circuit are designated by the reference characters + and —, it being recognized, of course, that in practice a usual power source would be provided, adapted to deliver both alternating current and direct current at various different voltages best adapted to the operation of the individual elements. For simplicity, it is assumed in the present diagram that all electroresponsive elements are adapted for operation at a single direct current voltage. In Figs. 23 and 23a, also, all relays are shown in the position normally occupied thereby when the intersection is clear of rail traffic and when all barriers are retracted.

Assuming that a train enters either of the track sections, described with reference to Fig. 22, such action immediately de-energizes the track relay XR, which thereupon falls to the de-energized position, opening its contacts a and d, and closing its contacts b, c, e, and f. The opening of contacts a is without immediate effect, except to render the circuit for the associated repeater relay XRR subject to control by the repeater relay LSR (Fig. 23a). The closure of contacts b and c of relay XR immediately completes, respectively, energizing circuits for the coils 218 of the exhaust valves associated with the approach and off-going barriers of unit A, the circuit for the off-going exhaust valve being subject to the normally closed contacts b of the vehicle operated relay AVR, associated with unit A, described hereinafter. The closure of contacts e and f, respectively, of relay XR immediately completes corresponding circuits for the windings 218 of the exhaust valves for the approach and off-going barriers of unit B, the latter circuit being subject to the now closed contacts b of the vehicle operated relay BVR, associated with unit B.

Upon completion of the just-mentioned exhaust valve circuits, the exhaust valves for all of the barriers at the intersection are immediately closed, which action does not, however, initiate an upward movement of any of the barriers, since the corresponding intake valves 174 are still closed.

The closure of contacts b of relay XR also completes, through the now closed contacts a of the repeater relay XRR, direct energizing circuits for the reset coils of the polarized relays APR and BPR, which are associated with the vehicle operated relays AVR and BVR, in the hereinafter described relation.

The opening of contacts d of relay XR immediately de-energizes the winding of the lighting relay LS, which thereupon resumes the de-energized position, opening its contacts a and closing its contacts d. The contacts b and c of relay LS are transfer contacts, and it will be understood that the de-energization of relay LS, causes these transfer contacts to disengage the associated upper terminals and engage the associated lower terminals.

The opening of contacts a of relay LS interrupts the circuit for the coil of the lighting repeater relay LSR, which relay does not, however, resume the de-energized position for a predetermined period of the order, for example, of two to three seconds.

The closure of contacts d of the lighting relay LS immediately completes the circuit from the positive terminal through the now closed transfer contacts a of the time element relay TER (Fig. 23), through the contacts d of relay LS and thence through the coil of the flasher relay FR to the negative side of the line. Upon completion of the latter circuit, the flasher relay FR is placed in operation. Relay FR is preferably of conventional form adapted, while energized, to vibrate its associated contacts a between the positions shown in Fig. 23a and opposite positions out of engagement with the indicated terminals and into engagement with the opposite indicated terminals.

It will be noticed that the circuit for the green traffic lights is normally closed through the transfer contacts b and c of the lighting relay LS, when the latter are in their energized positions. So long, therefore, as no rail traffic occupies either above mentioned track section, the green traffic lights remain lighted. As soon, however, as transfer contacts b and c of lighting relay LS move to the opposite positions, as aforesaid, the green traffic lights are extinguished and obvious circuits subject, however, to the transfer contacts a and b of the repeater lighting relay LSR, are completed for the yellow traffic lights, which action warns approaching motorists that rail traffic has entered one or the other of the traffic sections, and that the barriers will soon rise.

At the expiration of the timing period afforded by the relay LSR, the transfer contacts a and b thereof move to the opposite indicated positions, the contact c thereof is opened, and the contacts d and e thereof are closed.

The movement of transfer contacts a and b of the repeater relay LSR interrupts the previously described circuits for the yellow traffic lights and completes obvious circuits, also through the transfer contacts b and c of the lighting relay LS, for the red traffic lights, which latter action informs approaching motorists that the barriers are to start upwardly immediately.

The closure of the contacts d and e of the repeater lighting relay LSR completes conventional circuits, through the now closed contacts e and f of the repeater time element relay TERR (Fig. 23), for the barrier lights associated with the barriers of both units A and B, which lights thereupon start to flash. The circuits employed in response to the just-mentioned action are conventional, and it will be evident from Fig. 23a, that the barrier light at one end of each barrier is lighted during the interval that the light at the other end of the barrier is extinguished, and vice versa.

The opening of contacts c of the repeater lighting relay LSR interrupts the circuit for the winding of the repeater relay XRR. The latter relay is of the slow release type, preferably adapted to give a time delay of the order of from two to three seconds. At the expiration of the just-mentioned time delay period, relay XRR assumes the deenergized position, closing its contacts b, c, d, e and f, and moving its transfer contacts a from the illustrated upper position to the lower position.

The just-mentioned action of the transfer contacts de-energizes the re-set coils of the previously mentioned relays APR and BPR and applies potential to the galvanometer elements g of these relays, all for a purpose described hereinafter.

The closure of contacts b of the repeater relay XRR is without immediate effect, but the closure of contacts c, d, e and f completes energizing circuits for the windings of the approach and off-going intake valves 174 associated with the barriers of both unit A and unit B. More specifically, closure of contacts c completes the circuit from the positive side of the line through the now closed limit switch AAHI, the now closed contacts c of the hesitation relay AAZ for unit A and thence through the winding 175 of the intake valve for the approach barrier of unit A. Contact e closes a similar circuit for the winding 175 of the intake valve 174 for the approach barrier of unit B. Closure of contacts d of relay XRR completes a circuit from the positive side of the line through the now closed contacts c of the vehicle operated relay AVR, contacts d of relay XRR, the now closed limit switch AOH associated with the off-going barrier of unit A, the corresponding now closed limit switch AOF, and thence through the winding 175 of the intake valve 174 to the negative side of the line. Closure of contacts f of relay XRR completes a similar circuit for the winding of the intake valve 174 for the off-going barrier of unit B.

It will be appreciated that upon completion of the just-traced circuits of the intake valves of both the approach and off-going barriers for units A and B, these valves open, which action, referring particularly to Fig. 14, connects all of the rams to the associated sources of supply. These sources of supply thereupon deliver air at a relatively gradual rate to the several rams. As previously mentioned, when the pressures within the individual rams build up to approximately ten pounds per square inch, (assuming the barriers are unobstructed) the upward force exerted thereby on the barriers is sufficient to start them upwardly at a relatively gradual rate. As the barriers rise, the lights on the faces thereof become exposed to view, and as previously mentioned, these lights are now flashing.

Stated generally, each barrier now continues upwardly until it reaches the hesitation or warning position, at which position it is stopped for a predetermined period, the length whereof is determined by the timing on the time element relay TER (Fig. 23). More specifically, when the approach barrier of unit A reaches the intermediate or warning position, for example, approximately two inches above the level of the roadway, the associated limit switch AAH closes, which action thereupon completes a circuit through the now closed contacts $b$ of the repeater relay XRR for the coil of the auxiliary relay AAZ. Upon completion of this circuit, relay AAZ moves to the energized position, closing its contacts $a$ and $b$ and opening its contact $c$.

Closure of contacts $a$ of relay AAZ completes a holding circuit for the coil of relay AAZ, which is independent of the limit switch AAH, but which is, nevertheless, subject to contacts $b$ of relay XRR. Closure of contacts $b$ prepares the circuit for the coil of the time element relay TER. The opening of contact $c$ of relay AAZ opens the previously traced circuit for the winding 175, associated with the intake valve for the approach barrier of unit A, which valve thereupon moves to the closed position, stopping such approach barrier at the intermediate or warning position, but leaving the associated ram 110 under whatever pressure was developed therein in bringing the barrier to the warning position. It is here noted that at the warning position, the limit switch AAHI for the approach barrier of unit A also opens, which limit switch is employed for checking purposes in order to effect the just-mentioned stopping of the barrier at the warning position, even though the relay AAZ may fail to operate.

The arrival of the approach barrier for unit B at the warning position correspondingly closes the associated limit switch BAH and opens switch BAHI. Closure of limit switch BAH energizes the auxiliary relay BAZ for unit B and the opening of limit switch BAHI performs the checking function just described with reference to limit switch AAHI.

Upon being energized, relay BAZ closes its contacts $a$ and $b$, and opens its contacts $c$. Contact $a$ completes the holding circuit for relay BAZ, similar to the one traced for relay AAZ. The opening of contacts $c$ of relay BAZ interrupts the circuit for the intake valve associated with the approach barrier of unit B, which thereupon operates to stop this barrier at the warning position in the manner described above.

The closure of contacts $b$ of relay BAZ, conjointly with the previously described closure of contacts $b$ of relay AAZ, completes the circuit for energizing the winding of the time element relay TER, which relay is provided with timing means which delay its consequent closure for a predetermined period of the order, for example, of from three to five seconds. Relay TER governs the restarting of the various barriers from the warning to the fully elevated positions, and it will be noticed that this timing mechanism is not set in motion until the approach barriers at both sides of the intersection have arrived at the warning position.

Before discussing the action of the time element relay TER, it will be appreciated that as the off-going barriers for units A and B, respectively, reach the warning positions, the corresponding limit switches AOH and BOH are opened, which action, under all normal circumstances, may be expected to occur at substantially the same time that the corresponding limit switches for the approach barriers are opened. The opening of the just-mentioned limit switches de-energizes the windings of the associated intake valves, which action results in the closure of these valves and the stopping of the off-going barriers at the warning positions thereof, in the same manner as described above.

At the expiration of the time interval afforded by relay TER, this relay moves to the energized position, lifting its transfer contact $a$ to interrupt the circuit at the lower associated terminal and to close the circuit at the upper illustrated terminal.

The opening of the circuit through the lower terminal associated with the time element relay TER interrupts the previously traced energizing circuit for the coil of the flasher relay FR and also interrupts the normally complete energizing circuit for the winding of the steady light relay XER. In response to the latter action, relay XER assumes the de-energized position, closing its contacts $e$ and $f$, and moving its transfer contacts $a$, $b$, $c$, and $d$ from positions in engagement with the associated upper terminals to positions in engagement with the associated lower terminals. The just-described operations of the contacts $a$, $b$, $c$, $d$, $e$ and $f$ of the steady light relay XER have the effect of interrupting the previously described circuits for the barrier lights through the flasher relay contacts, and of completing direct energizing circuits for these lights independently of the flasher relay contacts. It will be appreciated, therefore, that the flashing of the barrier lights begins immediately before the barriers start upwardly and continues through the warning interval. At the expiration of the warning interval, however, at which time the barriers are started upwardly toward the fully elevated positions, the flashing of the barrier lights is interrupted and these lights are continuously energized.

The closure of the circuit through the now elevated contact $a$ of the time element relay TER completes an obvious energizing circuit for the repeater time element relay TERR, which thereupon closes its contacts $a$, $b$, $c$, and $d$ and opens its contacts $e$ and $f$. The latter action is without immediate effect, since contacts $e$ and $f$ are associated only with the flasher circuits, which latter circuits are now interrupted at certain of the contacts of the steady light relay XER.

The closure of contacts $a$, $b$, $c$ and $d$ of the repeater time element relay TERR recompletes energizing circuits for the windings of the intake valves associated with all of the barriers of both units A and B. More specifically, closure of contact $a$ completes the circuit for the winding 175 of the intake valve associated with the approach barrier of unit A, which circuit extends from the positive side of the line through contact c of relay XRR, in parallel through the now closed limit switch AAF for the corresponding barrier and the pressure switch AP, and thence through the contact a of relay TERR and the valve winding 175 to the negative side of the line. The circuit through contact c of relay TERR for the approach barrier of unit B is similar. The circuits for the off-going barriers of units A and B, respectively, are similar to those just traced except that these circuits include, respectively, the now closed contacts c of the corresponding vehicle operated relays AVR and BVR, the effect whereof is described below, and except, also, that these circuits have no pressure switches associated therewith. It will be appreciated that upon the re-opening of the several intake valves, the fluid sources associated therewith are again effective to supply pressure to the corresponding rams. Under normal circumstances and assuming the barriers are not obstructed, all the barriers may be expected to resume their upward movements substantially immediately upon the opening of the intake valves, without requiring the building up of additional pressure therein.

The closure of contacts b of relays AAZ and BAZ, which caused the operation of the time element relays TER and TERR, as described above, also completes a circuit for energizing one or more pilot lights PL, which may be and preferably are mounted at the intersection in positions to be visible to the approaching rail traffic, and which, when lighted, indicate to such traffic that the barrier system is functioning properly.

As the several approach and off-going barriers for units A and B arrive at the fully elevated positions, the corresponding limit switches AAF, AOF, BAF and BOF are opened, each switch assuming the open position thereof at the time the corresponding barrier reaches the fully elevated position. From the previous description, it will be appreciated that the opening of the limit switches AOF and BOF de-energizes the windings for the intake valves associated with the off-going barriers of units A and B, which valves thereupon close, isolating the associated rams from the source of pressure and leaving these rams charged with whatever unit pressures were required to bring them to the elevated positions, which pressures, under all normal circumstances, as aforesaid, may be expected to be of such value that, if necessary, these off-going barriers can readily be depressed by the passage thereover of a vehicle approaching such barriers, either from the face thereof or from the back thereof. This arrangement is further desirable in practice, in combination with the use of the hereinafter described vehicle operated controls for the off-going barriers, to facilitate the exit of vehicles from the area between the approach and off-going barriers for a particular traffic lane.

The opening of the limit switches AAF and BAF for the approach barriers of units A and B does not immediately open the circuits for the corresponding intake valves unless the previously mentioned pressure switches AP and BP have opened. Under normal circumstances, as aforesaid, it is to be expected that the barriers will be elevated to the fully projected positions under the influence of a low pressure of approximately ten pounds per square inch in the rams, which pressure is of a value which permits the barriers to be readily depressed by the passage of a vehicle thereover. Normally, therefore, the pressure switches AP and BP will be closed when the approach barriers reach the fully elevated positions. When these barriers reach the fully elevated positions, as aforesaid, the arms associated with the corresponding shock absorbers 140 abut the brackets 141 carried by associated casing structure, which action positively interrupts the upward movements thereof. Under these conditions, the pressure sources associated with the rams 110 for the approach barriers continue to introduce air into these rams, gradually building up the pressure therein. It is preferred to set the pressure switches AP and BP to operate at a pressure which is sufficient to maintain the barriers at or very near the fully elevated positions when subjected to the impact of a vehicle of average weight, travelling at a relatively high rate of speed. This pressure should, however, be set low enough so as to give the barrier a slight amount of resilience, as aforesaid, so as to enable the rams to absorb a portion of the impact shock, thereby relieving the stresses to which the elements of the barrier would otherwise be subjected. In practice, assuming that ten pounds per square inch is a satisfactory pressure for normal elevating purposes, a pressure of the order of thirty pounds per square inch is generally satisfactory for the operation of the pressure switch.

When the just-mentioned pressures, which may be called locking pressures, are reached in the rams associated with the approach barriers, respectively, the corresponding pressure switches AP and BP open, interrupting the circuits for the corresponding intake valves. These intake valves thereupon resume their closed positions, shutting off the supply of actuating fluid and leaving the corresponding rams charged with the locking pressures.

The limit switches AP and BP may be conventional pressure operated elements having contacts which are spring biased to the closed position, but which are moved to the open position and remain so as long as the fluid pressure to which the switch is subjected is at or above a predetermined value. Such pressure switches are indicated in outline form in Fig. 14, and it will be noticed that they are interposed between the associated intake valves and the associated rams so that these pressure switches remain in the open position while the associated barriers are in the elevated positions and until such time as the corresponding exhaust valves are opened to lower the barriers.

Summarizing the above, it will be recalled that the rams for the off-going barriers are supplied with fluid pressure until such time as the fully elevated positions are reached, at which time these rams are left charged at the elevating pressures. The rams for the approach barriers, however, continue to be supplied with pressure until such time as these rams reach the fully elevated positions and until such further time as the pressures therein reach values equal to the locking pressures. It will be appreciated that even though the approach barriers should be obstructed during their elevating movement to such a degree as to require the locking pressure to elevate them, the circuits for the associated intake valves remain closed until the fully elevated positions are reached.

All barriers normally remain at the fully elevated positions, with all traffic lights showing red and with all barrier lights continuously lighted, so long as the rail vehicle is in either of the track sections associated with the intersection. When, however, both track sections are cleared of rail traffic, the track relays TR1 and TR2 of Fig. 22 again become energized, which latter action re-energizes the main control relay XR. Upon being re-energized, relay XR recloses its contacts $a$ and $d$ and re-opens its contacts $b$, $c$, $e$ and $f$. The reclosure of contacts $a$, re-energizes the repeater relay XRR, which functions as described below. The reclosure of contacts $d$ of relay XR prepares a circuit to re-energize the lighting relays LS and LSR, which circuits are, however, subject to the approach barrier limit switches AAL and BAL, as described below.

The opening of contacts $b$, $c$, $e$ and $f$ of relay XR immediately interrupts the originally traced energizing circuits for the windings 218, associated with the exhaust valves for the barriers of units A and B. In response to this action, the exhaust valves for all of the barriers resume the normally open positions thereof, immediately connecting the associated rams to exhaust (Fig. 14). At this time, the individual rams are enabled to resume the normal retracted positions thereof under the influence of gravity, during which movements, the several limit switches operated thereby are restored to the original positions, designated in Fig. 25.

The re-energization of relay XRR, as aforesaid, causes the several contacts associated therewith to resume the positions shown in Fig. 23. The opening of contacts $c$, $d$, $e$ and $f$ prevents reclosure of any of the intake valve circuits which would otherwise occur due to the downward movement of the barriers and the consequent reclosure of certain of the barrier limit switches.

The contact $a$ of relay XRR is associated with the hereinafter described vehicle operated elements and the effect of this contact is described below. The re-opening of contacts $b$ of the relay XRR interrupts the previously traced holding circuits for the auxiliary relays AAZ and BAZ, which thereupon resume the illustrated positions and, in turn, cause the de-energization of the time element relays TER and TERR. The de-energization of relay TER recompletes at contact $a$ thereof the circuit for the steady light relay XER, which thereupon resumes the position shown in Fig. 23a and the de-energization of relay TERR recloses at the contacts $e$ and $f$ thereof the originally traced circuit for the flasher relay. The other contacts of relay TERR are without effect at this time, but serve to condition the system for a subsequent operation.

When the approach barriers for units A and B, moving downwardly under the influence of gravity, as aforesaid, reach elevations approximately two inches above the retracted positions, the corresponding limit switches AAL and BAL reclose, which limit switches remain closed except when the associated barriers are more than two inches above the retracted positions.

The reclosure of the limit switches BAL and AAL, recompletes, through the now closed contact $d$ of relay XR, the energizing circuit for the lighting relay LS, which latter relay thereupon resumes the illustrated position and also, through its contact $a$, re-energizes the repeater lighting relay LSR. The re-energization of the lighting relays LS and LSR restores the circuits for the traffic lights to the original conditions, namely, to conditions in which the yellow and red lights are extinguished and the green lights are lighted, indicating that the crossing is clear.

As mentioned above, the reclosure of contacts $e$ and $f$ of relay TERR recompleted the original energizing circuit for the flasher relay FR, and contacts $a$ of relay TER re-energized the steady light relay XER, which two actions restored the barrier light circuits to the flashing condition which obtained during the upward movement of the barriers to the warning position. The just-described re-energization of the lighting relay LS, however, which occurred when the barriers reached their retracted positions, also interrupts the circuit for the flasher relay FR and the re-energization of the repeater lighting relay LSR interrupts the barrier light circuits through the flasher relay. The return of the barriers to their retracted positions, therefore, in addition to restoring the traffic lights to the green condition, also interrupts the flashing of the lights, which flashing was initiated at the time the rail traffic entered the intersection.

In view of the fact that the shift of the traffic lights to green, and the extinguishment of the barrier lights depend upon the re-closure of the limit switches AAL and BAL, it will be appreciated that these actions do not occur until both approach barriers are in the fully retracted positions. The green lights, therefore, indicate not only that the intersection is free of rail traffic, but also that the approach barriers at both sides of the crossing are in the retracted positions or substantially in such positions. It will be noticed, also, that should the approach barrier for either unit A or unit B start upwardly for any reason, even in the absence of an operation of the train control relay XR, such movement of either approach barrier, if continued beyond the previously mentioned two inch point, would immediately open the corresponding limit switch AAL or BAL and thereupon effect the operation of the traffic and barrier lights, which was originally attributed to the operation of relay XR.

Summarizing the above, it will be appreciated that the clearing of the intersection by the rail traffic immediately de-energizes the exhaust valves, allowing the barriers to resume the retracted positions and resetting the system to its original condition with the barrier lights extinguished and with the traffic lights showing green.

Considering now the operation of the vehicle operated elements, it will be appreciated that from time to time a vehicle may be unable to stop, during the rise of the barriers, before reaching the approach barrier for the corresponding lane. Until such a time as such approach barrier has been locked up by the locking pressures, as aforesaid, such vehicle can readily depress the barrier and pass into the space between the approach and off-going barriers. Under these conditions, it is desirable, not only to enable such vehicle to readily depress the off-going barrier, as aforesaid, but it is further desirable to provide for the automatic lowering of such off-going barriers for a predetermined period, sufficiently long to normally allow such vehicle to clear the intersection.

In accordance with the present invention, this is accomplished by providing the previously mentioned units VUA and VUB, comprising the polarized relays APR and BPR and the associated relays AVR and BVR. Each polarized relay, which may be of conventional construction, comprises a galvanometer element, which is normally biased to the illustrated central position, in which it is free of the associated contact *a*. Each relay also comprises an actuating coil *c*, the terminals whereof lead to and are conventionally connected to a usual permanent magnet *m*, embedded in the roadway at the position indicated in Fig. 1, each magnet *m* being responsive to the passage of a vehicle in either of the two associated lanes. It will be understood that if a vehicle passes over either magnet, while moving in a direction from the associated approach barrier toward the associated outgoing barrier, such vehicle movement alters the flux conditions of the magnet and induces a potential between the terminals of the winding *c*, of such polarity that the resultant current flow in the relay winding *c* is in a direction to cause the corresponding galvanometer element *g* to move into engagement with the fixed contact *a*. If the vehicle in question is moving in the opposite direction, however, that is, in a direction from the corresponding outgoing barrier toward the approach barrier, the direction of current flow in the coil *c* is in the opposite direction and the galvanometer element tends to move away from the contact *a*.

Each polarized relay also preferably comprises means, not shown, which functions, after the actuating coil has been energized and moves the element *g* into engagement with the associated contact *a*, to releasably maintain such engagement until such time as the relay is reset. Accordingly, only a momentary energization of the winding *c* is necessary in order to cause the above operation of the relay. In order to reset each polarized relay to the illustrated open position, each relay is provided with a reset coil *r*, which upon being energized separates the element *g* from the contact *a* and restores the element *g* to the illustrated central position.

Under normal conditions, that is, when the associated intersection is clear, the circuits for the reset coils *r* of the relays are open at the contacts *b* of the main control relay XR, which, it will be recalled, remains in the energized position except when a rail vehicle is near the intersection. All vehicles passing the intersection, however, pass into operative range of one or the other of the permanent magnets *m* (Fig. 1) and each such operation causes a momentary flow of energy in the winding *c* of the corresponding relay. The polarized relays APR and BPR may, therefore, be regarded as normally in a position, when the intersection is clear, in which the moving elements *g* are in engagement with the corresponding contact *a*. This engagement is, however, without effect.

When a rail vehicle enters the region of the intersection, as aforesaid, the relay XR is de-energized and the consequent closure of the contact *b* thereof completes a circuit, through the transfer contact *a* of the relay XRR (which engages its upper terminal under the conditions stated) and thence in parallel through the reset coils *r* of the polarized relays, to the negative side of the line. This action energizes these coils and resets the polarized relays to the indicated central positions. As previously described, the de-energization of the relay XR causes, after a lapse of a few seconds, the de-energization of the relay XRR. The consequent movement of the transfer contact *a* of the relay XRR out of engagement with the upper terminal, de-energizes the reset coils *r* of the polarized relays, thereby rendering the galvanometer elements *g* subject to the action of the windings *c*. The engagement of the transfer contact *a* with the lower associated terminal applies a potential to the galvanometer element *g* of each polarized relay.

The de-energization of the relays XR and XRR also causes the barriers to start upwardly, as described above. It may now be assumed that a vehicle enters the space between the approach and off-going barriers for the corresponding lane, either while the barriers are rising, or after they have reached their fully elevated positions, and so passes into operative range of one or the other of the permanent magnets *m*. As aforesaid, if the vehicle in question is moving from the off-going barrier toward the approach barrier, that is, if the vehicle is travelling in the wrong lane, the resultant induced current in the polarized relay is in an ineffective direction. If, however, the vehicle in question is travelling toward the off-going barrier, such movement thereof past the corresponding permanent magnet causes the galvanometer element *g* of the associated polarized relay to move into and remain in engagement with the associated contact *a*.

The just-mentioned action completes an energizing circuit, through the now closed contact *b* of the relay XR, transfer contact *a* of relay XRR, galvanometer element *g*, and contact *a*, for the coil of the auxiliary relay APRR or BPRR, as the case may be. In the former case, the energization of relay APRR completes an energizing circuit through the contacts *b* and *a* of relays XR and XRR, respectively, for the coil of the associated vehicle operated relay AVR. In the latter case, the energization of relay BPRR completes an energizing circuit for the winding of the associated vehicle operated relay BVR.

The relay AVR is provided with a pair of contacts *b* and *c*, respectively, which are interposed in the circuits for the windings of the exhaust and intake valves for the off-going barrier of unit A. Similarly, relay BVR is provided with contacts *b* and *c*, which are interposed in the circuits for the windings of the exhaust and intake valves, respectively, of the off-going barrier for unit B. If relay AVR is operated, therefore, the off-going barrier for unit A is caused to drop to the retracted positions under the influence of gravity and if relay BVR is operated, the off-going barrier of unit B is caused to drop.

Relay AVR is provided with an additional contact *a*, which, upon operation of this relay, completes an energizing circuit, through the contacts *b* and *a* of relays XR and XRR for the corresponding polarized relay reset coil *r*. Relay BVR is provided with a contact *a*, which, upon closure, completes a similar circuit for the reset coil of the associated polarized relay. As soon as either relay AVR or BVR operates, therefore, they cause the resetting of the associated polarized relay, which action resets the associated polarized relay to the illustrated position, interrupting the circuit for the corresponding relay AVR or BVR.

The relays AVR and BVR are of the slow release type, and are arranged to hold their contacts in the operated position for a period of, for example, six to eight seconds, after the coils are de-energized. Consequently, when relay AVR is energized, it maintains the circuit for the exhaust and intake valves of the associated barrier in an open condition for a corresponding period. Similar comments, of course, apply to relay BVR.

It will be understood, therefore, that the passage of a vehicle between the approach and offgoing barriers for the intersection, when the latter are moving upwardly or are elevated, and assuming the vehicle is traveling in the proper direction, causes the corresponding off-going barrier to drop and remain down for a period of from six to eight seconds, for example, sufficient to allow the vehicle in question to pass out of the intersection. At the expiration of the just-mentioned timing period, the resetting of the vehicle operated relay AVR or BVR restores the corresponding valve circuits to the same conditions as obtained prior to the vehicle operation.

If the just-mentioned dropping of the off-going barrier occurred at a time when such barrier was at or below the warning position, the re-energization of the exhaust and intake valves for such barrier, caused by the resetting of the vehicle operated relay AVR or BVR, leaves such barrier again subject to the operation of the corresponding limit switch AOH or BOH, as initially described. On the other hand, if such dropping of the off-going barrier occurred during the travel of the associated barrier from the warning position to the fully elevated position, or occurred after the barrier reached the fully elevated position, such barrier immediately moves to the fully projected position upon re-energization of the valves. More specifically, in the latter case, the circuit for the intake valve for the off-going barrier of unit A extends through the again closed contact c of relay AVR, through the now closed contact b of relay TERR, and thence through the limit switch AOF to the valve winding, it being understood that the limit switch AOF remains closed until the barrier reaches the elevated position.

It will be noticed, also, that if a second vehicle follows the above described first vehicle through the intersection, before the expiration of the above-mentioned six to eight seconds timing period, the passage of the second vehicle into operative range of the corresponding permanent magnet m re-energizes the corresponding relay APRR or BPRR and consequently re-energizes the corresponding vehicle operated relay AVR or BVR. The latter relay, upon being re-energized, again causes interruption of its own circuit and re-starts its timing period. Such second vehicle is thus allowed the full six to eight seconds period during which to clear the intersection.

As indicated in Fig. 23, manually operated switches AM and BM are preferably associated with the vehicle operated elements and which, upon closure, energize the respective auxiliary relays APRR and BPRR, which, in turn, operate the vehicle operated relays AVR and BVR in the previously described manner. The switches AM and BM are provided primarily for checking purposes.

In the foregoing description of operation, it has been assumed that the different barriers at the intersection are subjected to substantially the same obstructing forces, and that consequently these barriers rise and fall at substantially the same rates. This is the normal operation of the system. Under certain circumstances, it may be assumed that the barriers are subjected to somewhat different obstructing forces and under these conditions, the individual barriers may move upwardly at different rates. As aforesaid, the ram individual to each barrier is effective to build up a pressure sufficient to ultimately overcome these obstructing forces. In view of the fact that the limit switches which stop the barriers at the hesitation points are individual thereto, it will be appreciated that each barrier continues to be supplied with air at a pressure which increases to whatever value is necessary to elevate the same, until such time as that barrier reaches the warning position. Also, the timing periods of relays TER and TERR, which determine the periods throughout which the barriers remain at the warning positions, are not begun until all approach barriers for the intersection have reached the warning position. The timing period afforded by the relays TER and TERR is not modified if any of the barriers are depressed during such warning period. This is for the reason that the circuits for the relay TERR are independent of the positions of the off-going barriers. The circuits for relays TER and TERR depend upon relays AAZ and BAZ, which latter relays are initially energized through the hesitation point limit switch of the corresponding approach barriers. Upon being energized, however, relays AAZ and BAZ complete self-holding circuits, which are independent of such limit switches.

Reverting now to Figs. 2, 3, and 5 through 11, it will be appreciated that it is advisable to from time to time inspect the barriers. Such inspection and any necessary repairs are readily possible with the present construction, which enables each individual barrier to be lifted beyond the normal range of its elevating movement to the pull-away or service position, shown in Fig. 5. It will be noticed that the only operations which must be performed in order to release each barrier from its associated casing are to disconnect the auxiliary hinges 64, to disconnect the ram 110, and to disconnect the shock absorbers 140. The disconnection of the auxiliary hinges 64 is readily performed by loosening the associated holding studs 78, which are accessible from the exterior of the barrier, as clearly appears in Fig. 2. The release of the ram is readily effected by disconnecting the piston rod 116 from its associated clevis 117. For this purpose, the releasable connection of Fig. 8 may be and preferably is employed. This connection comprises a relatively light pin 119, which is passed transversely through the pivot pin 118. A spring clip 121 bears upon one end of the pin 119, and holds the other end under a pad 115, thereby holding the pin 119 in place and preventing withdrawal of the pivot pin 118 in either direction from the clevis 117. By relieving the pressure of the clip 121, however, the pin 119 may be withdrawn, thereby permitting the pivot pin 118 to be withdrawn. Similar connections may be employed in connection with the clevises 150, associated with the shock absorber arms 148. As previously mentioned, the lighting units 92 can be swung to the positions shown in dotted lines in Fig. 7, thereby affording access to the interior of the associated barrier for the purpose of releasing the shock absorber connections. In addition, a removable plate 113, held in place by studs 111 (Figs. 4 and 11), is provided at an intermediate point along the length of each barrier, which upon removal, affords access to the interior of the barrier for the purpose of releasing the ram connection.

By virtue of the just-mentioned pull-away movement, full access, both to the interior of each barrier and to the interior of the associated casing, is afforded, thus eliminating any otherwise existing necessity of providing relatively deep pits or casings and of providing doors or traps through which the same may be entered.

Although only several specific embodiments of the invention have been described in detail, it will be appreciated that various modifications in the form, number, and arrangement of parts may be made within the spirit and scope of the present invention. Claims to certain of the structural features of the aforesaid barriers and to certain of the aforesaid valve mechanisms are being presented in applicant's copending applications Serial No. 461,684 and Serial No. 461,685, filed, respectively, October 12, 1942, and October 12, 1942.

What is claimed is:

1. In a protective system for a point along a roadway, the combination of a barrier extending partially across said roadway in advance of said point, said barrier being movable from a retracted position to a projected position in the path of vehicles traversing said roadway and approaching said point, means mounting said barrier so that the impact force of a said vehicle against said barrier when projected urges said barrier toward said retracted position, a fluid motor connected to said barrier for moving the same from said retracted position to said projected position, and means for supplying said motor with an elastic actuating fluid.

2. In a protective system for a point along a roadway, the combination of a barrier extending partially across said roadway in advance of said point, said barrier being movable from a retracted position to a projected position in the path of vehicles traversing said roadway and approaching said point, a fluid motor connected to said barrier for moving the same from said retracted to said projected position, means for supplying said motor with an elastic actuating fluid, and means mounting said barrier so that the impact force of a said vehicle thereagainst when projected opposes the force exerted by said fluid motor whereby said fluid motor absorbs in part at least said impact force.

3. In a protective system for a roadway, the combination of a barrier movable from a retracted position to a projected position, a fluid motor connected to said barrier for moving the same from said retracted position to said projected position, means for supplying said motor with an elastic actuating fluid to effect said movement, and means for cutting off the supply of said actuating fluid for a predetermined interval when said barrier reaches an intermediate position, said last-mentioned means being arranged to resume the supply of said fluid to said motor at the expiration of said interval.

4. In a protective system for a roadway, the combination of a barrier movable from a retracted position to a projected position in the path of vehicles traversing said roadway, means mounting said barrier so that the impact force of a vehicle against said barrier when projected urges said barrier toward said retracted position, a fluid motor connected to said barrier for moving the same from said retracted position to said projected position, means providing a supply of elastic actuating fluid for said motor at a pressure substantially in excess of that normally required to move said barrier when unobstructed, and means for gradually delivering said fluid to said motor so that if unobstructed said barrier gradually moves toward said projected position at said normal pressure in said motor and if said barrier is obstructed the pressure builds up in said motor to said higher value.

5. In a protective system for a roadway, the combination of a barrier movable from a retracted position to a projected position in the path of vehicles traversing said roadway, means mounting said barrier so that the impact force of a vehicle against said barrier when projected urges said barrier toward said retracted position, a fluid motor connected to said barrier for moving the same from said retracted position to said projected position, means affording a source of supply of elastic fluid at a pressure substantially in excess of that required to normally move said barrier from said retracted to said projected position, means for gradually delivering said fluid to said motor so as to normally effect a gradual movement of said barrier toward said projected position, means for maintaining a pressure in said motor while said barrier is projected of a valve intermediate said normal pressure and said higher pressure, said source acting to build up said higher pressure in said motor only in the event projecting movement of said barrier is obstructed.

6. In a protective system for a roadway, the combination of a pair of barriers positioned at spaced points along said roadway, each said barrier being movable from a retracted position to a projected position in the path of vehicles traversing said roadway, a fluid motor connected to each said barrier for moving the same from its retracted position to its projected position, means affording a source of supply of elastic fluid for each motor at a pressure substantially in excess of that required to normally move the corresponding barrier from the retracted to the projected position, means for maintaining the pressure in the motor for one of said barriers at said normal pressure when the corresponding barrier is projected, and means for maintaining the pressure in the other motor at a considerably higher value when said other barrier is in the projected position.

7. In a protective system for a point along a roadway, the combination of a barrier, means hingedly mounting said barrier for pivotal movement about an axis extending across said roadway between a retracted position in which the barrier is embedded in the roadway and a projected position in the path of vehicles traversing said roadway, said axis being located in advance of said point, a fluid motor connected to said barrier for moving the same from said retracted to said projected position, means for supplying said motor with an elastic actuating fluid, said motor being connected to said barrier in such relation that the impact force of a vehicle striking said barrier while approaching said point opposes the force exerted by said motor whereby said motor absorbs in part at least said impact force.

8. In a protective system for a roadway, the combination of a barrier movable between a retracted position and a projected position, means comprising a fluid motor for effecting said movement of said barrier, intake and exhaust means for connecting said motor to a source of elastic fluid under pressure and for exhausting said fluid from said motor, and control means operable to close said exhaust means and open said intake means to cause said barrier to move toward said projected position, to close said intake means while maintaining said exhaust means closed to maintain said barrier at said projected position, and to open said exhaust means while maintaining said intake means closed to cause said barrier to move to said retracted position.

9. In a protective system for a roadway, the combination of a barrier movable between a retracted position and a projected position; means comprising a fluid motor for effecting said movement of said barrier; intake and exhaust means for connecting said motor to a source of elastic fluid under pressure and for exhausting said fluid from said motor; and control means comprising means operable to close said exhaust means and open said intake means to cause said barrier to move toward said projected position, to close said intake means while maintaining said exhaust means closed to maintain said barrier at said projected position, and to open said exhaust means while maintaining said intake means closed to cause said barrier to move to said retracted position; said control means further comprising means operable to close said intake means for a predetermined interval when said barrier reaches an intermediate position while maintaining said exhaust means closed and to re-open said intake means at the expiration of said interval while maintaining said exhaust means closed so as to cause said barrier to continue towards said projected position.

10. In a protective system for a roadway, the combination of a barrier movable from a retracted position to a projected position in the path of vehicles traversing said roadway, a fluid motor connected to said barrier for moving the same from said retracted position to said projected position, means affording a source of supply of elastic actuating fluid for said motor at a pressure substantially in excess of that normally required to cause said barrier to move from said retracted position towards said projected position, means for gradually delivering said fluid to said motor so as to cause said barrier to normally move towards said projected position at said normal pressure, means preventing movement of said barrier beyond said projected position, and control means for maintaining the pressure in said motor when the barrier is at the projected position at a value in excess of said normal pressure.

11. In a protective system for a roadway, the combination of a barrier movable from a retracted position to a projected position in the path of vehicles traversing said roadway, a fluid motor connected to said barrier for moving the same from said retracted position to said projected position, means affording a source of supply of elastic actuating fluid for said motor at a pressure substantially in excess of that normally required to cause said barrier to move from said retracted position towards said projected position, means for gradually delivering said fluid to said motor so as to cause said barrier to normally move towards said projected position at said normal pressure, means preventing movement of said barrier beyond said projected position, and pressure responsive control means operable to cut off the supply of said fluid when the barrier is at the projected position and the pressure in said motor has built up to a value in excess of said normal pressure.

12. In a protective system for a roadway, the combination of a pair of barriers spaced along said roadway and movable between retracted positions and projected positions in the path of vehicles traversing said roadway, means for moving said barriers between said positions, and means responsive to the travel of a vehicle in the space between said barriers for causing the barrier being approached by said vehicle to move to the retracted position.

13. In a protective system for a roadway, the combination of a pair of barriers positioned at spaced points along said roadway, each said barrier being movable between a retracted position and a projected position in the path of vehicles traversing said roadway, a fluid motor individual to each barrier for moving the same from the retracted to the projected position, means for supplying fluid to said motors to effect said movement thereof, and means responsive to the movement of a vehicle in the space between said barriers for exhausting the motor associated with the barrier towards which the vehicle is moving to thereby cause said barrier to move to the retracted position.

14. In a protective system for a roadway, the combination of a pair of barriers spaced along said roadway and movable between retracted positions and projected positions in the path of vehicles traversing said roadway, means for moving said barriers between said positions, and means responsive to the travel of a vehicle in the space between said barriers for causing the barrier being approached by said vehicle to move to the retracted position, said last-mentioned means being operative to cause said one barrier to re-assume the projected position at the expiration of a predetermined interval.

15. In a protective system for an intersection associated with a roadway, the combination of a pair of barriers positioned along said roadway at respectively opposite sides of said intersection, each said barrier normally occupying a retracted position but being movable from said retracted position to a projected position in the path of vehicles traversing said roadway, means responsive to a predetermined traffic condition at said intersection for causing said barriers to move to said projected position, and vehicle operated means responsive to the movement of a vehicle past a predetermined point along said roadway for causing certain of said barriers to move to the retracted position.

16. In a protective system for an intersection associated with a roadway, the combination of a pair of barriers positioned along said roadway at respectively opposite sides of said intersection, each said barrier normally occupying a retracted position but being movable from said retracted position to a projected position in the path of vehicles traversing said roadway, means responsive to a predetermined traffic condition at said intersection for causing said barriers to move to said projected position, and means responsive to the passage of a vehicle in the space between said barriers for causing the barrier towards which the vehicle is moving to move to the retracted position.

17. In a protective system for an intersection associated with a roadway, the combination of a pair of barriers positioned along said roadway at respectively opposite sides of said intersection, each said barrier normally occupying a retracted position but being movable from said retracted position to a projected position in the path of vehicles traversing said roadway, means responsive to a predetermined traffic condition at said intersection for causing said barriers to move to said projected position, and means responsive to the passage of a vehicle in the space between said barriers for causing the barrier towards which the vehicle is moving to move to the retracted position, said last-mentioned means comprising timing means to cause the lowered barrier to resume the projected position at the expiration of a predetermined interval.

18. In a protective system for a roadway, the combination of a barrier movable from a retracted position to a projected position in the path of vehicles traversing said roadway, a fluid motor connected to said barrier for moving the same from said retracted position toward said projected position, and means for supplying said motor with an elastic actuating fluid, said last-mentioned means operating to effect said supply at a rate which is gradual and normally causes a gradual rise of said barrier, said rate being further so gradual that a vehicle engaging the barrier during said rise is enabled to return the same to the retracted position, during which return movement the fluid in the motor is compressed.

19. In a protective system for a roadway, the combination of a barrier movable from a retracted position to a projected position in the path of vehicles traversing said roadway, a fluid motor connected to said barrier for moving the same from said retracted position to said projected position, and means for supplying said motor with an elastic actuating fluid, said last-mentioned means operating to effect said supply at a rate which is gradual and normally causes a gradual rise of said barrier, said rate being further so gradual that a vehicle engaging the barrier at any stage of its said movement from said retracted position to the projected position is enabled to return the barrier to its retracted position, during which return movement the fluid supplied to said motor is compressed.

20. In a protective system for a roadway, the combination of a barrier movable from a retracted position to a projected position in the path of vehicles traversing said roadway, a fluid motor connected to said barrier for moving the same from said retracted position to said projected position, means for supplying said motor with an elastic actuating fluid, said last-mentioned means operating to effect said supply at a rate which is gradual and normally causes a gradual rise of said barrier, said rate being further so gradual that a vehicle engaging the barrier at any stage of its said movement from said retracted position to the projected position is enabled to return the barrier to its retracted position, during which return movement the fluid supplied to said motor is compressed, said barrier having means to interrupt its movement when it reaches the projected position, and said means being operative to continue the supply of fluid to the motor after said interruption so as to increase the fluid pressure in the motor to a value at which a said vehicle is ineffective to return the barrier to its retracted position.

21. In a protective system for a roadway, the combination of a barrier movable from a retracted position to a projected position in the path of vehicles traversing said roadway, means mounting said barrier so that the impact force of a vehicle against said barrier when projected urges said barrier toward said retracted position, a fluid motor connected to said barrier for moving the same from said retracted position to said projected position, means providing a source of supply of elastic actuating fluid for said motor which is capable of building the elastic fluid pressure in said motor up to a value substantially in excess of that normally required to move said barrier when unobstructed, said last-mentioned means including means for effecting a gradual delivery of said fluid to said motor so that if the barrier is unobstructed said barrier gradually moves toward said projected position at said normal pressure in said motor and if said barrier is obstructed the pressure builds up in said motor to said higher value.

22. In a protective system for a roadway, the combination of a barrier movable from a retracted position to a projected position in the path of vehicles traversing said roadway, means mounting said barrier so that the impact force of a vehicle against said barrier when projected urges said barrier toward said retracted position, a fluid motor connected to said barrier for moving the same from said retracted position to said projected position, means affording a source of supply of elastic fluid for said motor which is capable of developing a fluid pressure in said motor substantially in excess of that required to normally move said barrier from said retracted position to said projected position, said last-mentioned means including means for effecting a gradual delivery of said fluid to said motor so as to normally effect a gradual movement of said barrier toward said projected position, and further including means for maintaining a pressure in said motor while said barrier is projected of a value intermediate said normal pressure and said higher pressure, said source acting to build up said higher pressure in said motor only in the event projecting movement of said barrier is obstructed.

SULO M. NAMPA.